United States Patent
Darby et al.

(10) Patent No.: US 6,793,310 B2
(45) Date of Patent: Sep. 21, 2004

(54) CERTIFIED PROOFING

(75) Inventors: Samuel Darby, North Andover, MA (US); Foster M. Fargo, Jr., Lincoln, MA (US); Adam I. Pinard, Carlisle, MA (US)

(73) Assignee: Creo Americas, Inc., Billerica, MA (US)

( * ) Notice: Subject to any disclaimer, the term of this patent is extended or adjusted under 35 U.S.C. 154(b) by 162 days.

(21) Appl. No.: 10/118,608

(22) Filed: Apr. 8, 2002

(65) Prior Publication Data

US 2003/0189610 A1 Oct. 9, 2003

(51) Int. Cl.⁷ .............................. B41J 29/38; B41J 2/01
(52) U.S. Cl. ..................................... 347/16; 347/105
(58) Field of Search .......................... 347/16, 105, 106; 355/6

(56) References Cited

U.S. PATENT DOCUMENTS

| | | | |
|---|---|---|---|
| 3,771,443 A | 11/1973 | Georghallis | 101/93 |
| 4,243,983 A | 1/1981 | Vyas | 340/674 |
| 4,428,287 A | 1/1984 | Greiner | 101/170 |
| 4,557,597 A | 12/1985 | Iwama | 356/71 |
| 4,657,239 A | 4/1987 | Ikesue et al. | 271/227 |
| 4,734,643 A | 3/1988 | Bubenik et al. | 324/232 |
| 4,786,940 A | * 11/1988 | Daniele | 347/129 |
| RE32,967 E | 6/1989 | St. John et al. | 242/57.1 |
| 4,887,530 A | 12/1989 | Sainio | 101/181 |
| 4,897,670 A | 1/1990 | Hasegawa et al. | 346/76 |
| 4,925,215 A | 5/1990 | Klaiber | 283/82 |
| RE33,498 E | 12/1990 | Proulx et al. | 400/630 |
| 5,025,269 A | 6/1991 | Saeki et al. | 346/108 |
| 5,039,085 A | 8/1991 | Stellmach | 271/227 |
| 5,040,003 A | 8/1991 | Willis | 346/157 |
| 5,071,274 A | 12/1991 | Niikawa | 400/621 |
| 5,088,848 A | 2/1992 | De Falco et al. | 400/630 |
| 5,115,256 A | 5/1992 | Miyagi | 346/108 |
| 5,116,150 A | 5/1992 | Courtney | 400/320 |
| 5,124,536 A | 6/1992 | Priddy et al. | 235/432 |
| 5,127,752 A | 7/1992 | Courtney | 400/342 |
| 5,266,976 A | 11/1993 | Ohigashi et al. | 346/157 |
| 5,278,625 A | 1/1994 | Charnitski et al. | 355/326 |
| 5,313,886 A | 5/1994 | Muller | 101/486 |
| 5,315,380 A | 5/1994 | Ingraham et al. | 358/500 |
| 5,383,731 A | 1/1995 | Hattori et al. | 400/76 |
| 5,384,592 A | 1/1995 | Wong | 346/157 |
| 5,489,767 A | 2/1996 | Billington | 235/437 |

(List continued on next page.)

FOREIGN PATENT DOCUMENTS

| | | |
|---|---|---|
| EP | 0488724 A2 | 6/1992 |
| JP | 54-56847 | 5/1979 |
| JP | 59-123670 | 7/1984 |
| JP | 59-138461 | 8/1984 |
| JP | 59-226560 A | 12/1984 |
| JP | 60-71260 | 4/1985 |
| JP | 62-196167 | 8/1987 |
| JP | 63-191661 | 8/1988 |

(List continued on next page.)

*Primary Examiner*—Stephen D. Meier
*Assistant Examiner*—Alfred Dudding
(74) *Attorney, Agent, or Firm*—Kristofer E. Elbing

(57) ABSTRACT

A set of ink-jet printable proofing sheets are disclosed that each comprise a first printable face having a periphery including first, second, third, and fourth edges. The first and third edges are disposed opposite each other on the first printable face, and the second and fourth edges are disposed opposite each other on the first printable face. The first face has properties resulting from a deposited ink drop print-enhancing treatment. Each sheet also includes a second face sharing the periphery and the first, second, third, and fourth edges of the first printable face, and a first machine-readable mark located on one of the first and second faces and including a plurality of data areas of different densities, with the combination of densities in the data areas being unique to each sheet.

48 Claims, 14 Drawing Sheets

U.S. PATENT DOCUMENTS

| | | | |
|---|---|---|---|
| 5,521,674 A | 5/1996 | Guillory et al. | 355/200 |
| 5,564,848 A | 10/1996 | Quintana | 400/708 |
| 5,631,686 A | 5/1997 | Castelli et al. | 347/133 |
| 5,757,393 A | 5/1998 | Suzuki | 347/16 |
| 5,764,251 A | 6/1998 | Hashimoto | 347/16 |
| 5,774,146 A | 6/1998 | Mizutani | 347/43 |
| 5,774,639 A | 6/1998 | Schildkraut et al. | 395/115 |
| 5,801,722 A | 9/1998 | Ueda et al. | 347/16 |
| 5,854,958 A | 12/1998 | Tanimoto et al. | 399/49 |
| 5,946,537 A | 8/1999 | Nakayasu et al. | 399/301 |
| 5,957,598 A | 9/1999 | Berkers et al. | 400/630 |
| 6,008,826 A | 12/1999 | Foote et al. | 347/116 |
| 6,022,154 A | 2/2000 | Allen | 400/76 |
| 6,079,807 A | 6/2000 | Lindstrom et al. | 347/16 |
| 6,097,497 A | 8/2000 | McGraw | 358/1.12 |
| 6,101,359 A | 8/2000 | Tamura | 399/301 |
| 6,106,115 A | 8/2000 | Mueller et al. | 347/104 |
| 6,108,436 A | 8/2000 | Jansen et al. | 382/112 |
| 6,118,463 A | 9/2000 | Houki et al. | 347/116 |
| 6,121,992 A | 9/2000 | Girmay | 347/234 |
| 6,128,459 A | 10/2000 | Iwata et al. | 399/301 |
| 6,135,446 A | 10/2000 | Thiemann et al. | 271/228 |
| 6,137,988 A | 10/2000 | Yonemochi | 399/384 |
| 6,137,989 A | 10/2000 | Quesnel | 399/394 |
| 6,178,009 B1 | 1/2001 | Yamada et al. | 358/1.9 |
| 6,209,866 B1 | 4/2001 | Hosking et al. | 271/228 |
| 6,381,416 B2 | 4/2002 | Manico et al. | 396/207 |
| 6,381,418 B1 | 4/2002 | Spurr et al. | 396/310 |

FOREIGN PATENT DOCUMENTS

| | | |
|---|---|---|
| JP | 1-209162 | 8/1989 |
| JP | 1-253454 | 10/1989 |
| JP | 8-23661 | 3/1990 |
| JP | 02-077741 | 3/1990 |
| JP | 5-177887 | 7/1993 |
| JP | 6-31967 | 2/1994 |
| JP | 6-161321 | 6/1994 |

\* cited by examiner

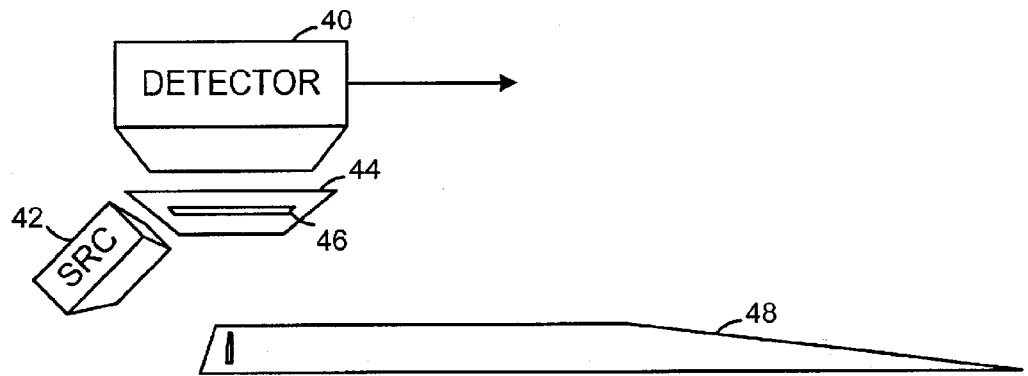
FIG. 2
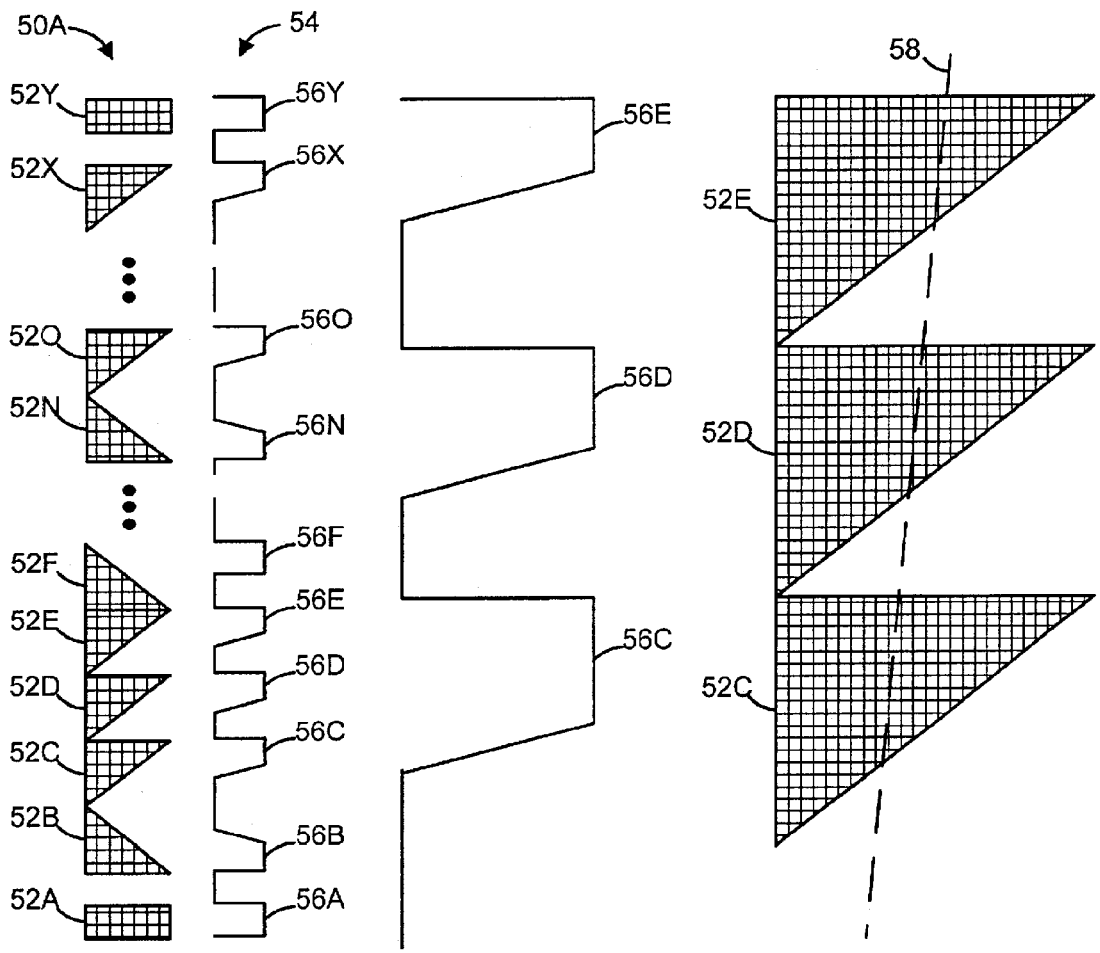
FIG. 3        FIG. 4

CERTIFIED PROOFING

FIELD OF THE INVENTION

This application relates generally to proof printers, such as inkjet proofers.

BACKGROUND OF THE INVENTION

Proofing is a crucial step in high-volume printing operations. This is because high volume printing presses are typically expensive to set up and run, and they generally cannot be stopped before hundreds or even thousands of pages have been consumed. And if an error is not detected until after a whole run is complete, millions of pages can be wasted. Printing professionals therefore commonly use dedicated ink-jet proof printers to create so-called "contract proofs," which they present to their customers for approval before beginning high-volume printing runs.

Given the potential costs at stake, it is of the utmost importance to ensure that these contract proofs match the final output. To this end, the print data are color corrected so that the inks used on the proof printer can accurately match the colors in the final output. The data may also be processed to allow the proof printer to accurately reproduce image artifacts characteristic of the high-volume printing process. And printing professionals must be careful to regularly calibrate their proofing printers and to consistently use appropriate inks and substrates for their proofs. But proofing errors can happen even in the most meticulously run operations, and the cost of such errors can be quite high.

SUMMARY OF THE INVENTION

Systems according to the invention introduce a radical new approach to proofing, in which the proofing system itself provides for the enforcement of certification standards, and such systems can prevent costly and time-consuming errors in high-volume printing. By automatically imposing a strict and complete set of certification standards, and physically identifying a proof to be in conformance with this set of certified proofing standards, proofers according to the invention can enable printing professionals to devote less time to monitoring calibration, stock, and employee handling of equipment and supplies. This can reduce proof cost and quality.

Systems according to the invention can drastically reduce the occurrence of proofer misuse. It is believed based on analysis of field service reports that a large part of the most troublesome proofing errors are caused by human errors and/or possibly well-intentioned tampering. Indeed, even the most scrupulous operators are not perfect, and may occasionally select inappropriate substrates or put them in upside-down, for example. And inexperienced or distracted operators may also make more serious errors, such as soiling proofers and proofs by reinserting used substrates that cannot absorb the excess ink deposited on them. By reducing these types of errors, systems according to the invention may be capable of consistently producing higher quality proofs in real conditions, while avoiding waste in proofing inks and substrates. And customers may be able to better judge a proof that meets a consistent, comprehensive, and automatically enforced set of standards, than one that is suspected to be subject to possible variations.

Systems according to the invention can also document the certification by printing a certification notice on the proof itself. This conveys to both the operator and customer that particular certification standards were adhered to in the preparation of the proof, and can identify those standards unambiguously. Printing a certification notice on the proof may also reduce the possibility of mistaking an earlier draft run for a final sign-off proof.

Systems according to the invention may additionally be beneficial in that they allow for simultaneous detection of a variety of types of certification information from a single substrate sensor. Such systems can reliably and substantially simultaneously derive loading information, substrate makeup information, and even individual substrate identity from marks that can be readily inscribed on substrate materials in bulk operations. This allows systems according to the invention to obtain a comprehensive and powerful set of certification signals in a cost-effective manner.

And systems according to the invention can use media sequence numbers obtained from the sensor to avoid re-loading a substrate and thereby causing soiling of print engine parts with excess ink that the substrate can no longer absorb. Sequence numbers can also provide a precise remaining paper counter and enable efficient and precise tracking of recalls of bad stock. In some instances, sequence numbers may be even be useful in detecting counterfeit substrates.

Sequence numbers can further provide for efficient automated tracking of sheets within an organization. For example, some larger print shops employ centralized proofing facilities that are located in different cities than are the presses for which they are to provide proofs. In these types of situations, users at the press locations can use the sequence numbers to access a database of sheet parameters to confirm the settings used for the proof, instead of having to contact the proofing facility. And if some bad proofs are received in a batch of proofs sent from the proofing location, the sequence number can be used to help pinpoint the machine that generated them.

In one general aspect, the invention features a set of ink-jet printable proofing sheets that includes at least five sheets. Each of these sheets comprises a first printable face having a periphery including first, second, third, and fourth edges. The first and third edges are disposed opposite each other on the first printable face, and the second and fourth edges are disposed opposite each other on the first printable face. The first face has properties resulting from a deposited ink drop print-enhancing treatment. Each sheet also includes a second face sharing the periphery and the first, second, third, and fourth edges of the first printable face, and a first machine-readable mark located on one of the first and second faces and including a plurality of data areas of different densities, with the combination of densities in the data areas being unique to each sheet.

In preferred embodiments, the first printable face can include an added deposited ink drop print-enhancing composition. The first mark on each sheet can include a plurality of fields, with the marks being encrypted using a public-key encryption sheet. The combination of at least some of the density differences in the marks on each of the sheets can uniquely identify a type for the sheet on which they are located. The combination of at least some of the density differences in the marks on each of the sheets can uniquely identify a size for the sheet on which they are located. The combination of at least some of the density differences in the marks on each of the sheets can uniquely identify a lot for the sheet on which they are located. The combination of at least some of the density differences in the marks on each of the sheets can define an error-correcting code for the sheet on which they are located. The first mark on each sheet can include at least one registration marking in addition to the data areas. The first mark on each sheet can include at least three registration markings in addition to the data areas. The first mark on each sheet can include a plurality of triangular data markings. The first mark can be printed in cyan ink. The first mark can be printed with an invisible ink. The first machine-readable mark can have a chroma of at least about 20 in L'a'b' space. Each sheet can further include a second machine-readable mark located on a same one of the first and second faces and including a plurality of data areas of different densities, with the combination of densities in the data areas being unique to each sheet in the plurality of sheets. The first and second marks on each sheet can include at least one registration marking in addition to the data areas. The first and second marks on each sheet can include at least three registration markings in addition to the data areas. The plurality of sheets can include at least 25 sheets. The plurality of sheets can be at least about 70% blank. The plurality of sheets can be packaged in a wrapper. The plurality of subsets of the plurality of sheets can each be packaged in a wrapper. The set can further include a rigid packaging element for providing support to the first and second faces, with the rigid packaging element being more rigid than the plurality of sheets. The plurality of sheets and the rigid packaging element can be packaged in a wrapper. The rigid packaging element can form part of a wrapper that packages the sheets. The data areas of different densities can employ an encoding method capable of uniquely identifying at least about 10,000,000 sheets. The data areas of different densities can employ an encoding method capable of uniquely identifying at least about $2^{40}$ sheets. The first and second faces can be at least 11 inches by 18 inches. The first and second faces can be at least 20 inches by 28 inches. The machine readable mark can be located in a margin area proximate one of the edges of one of the first and second faces. Each sheet can further including a second machine-readable mark, with the first and second machine-readable marks being aligned in a direction parallel to the first edge. The first machine readable mark can be located in a margin area proximate a corner between the first and second edges, with the second machine readable mark being located in a margin area proximate a corner between the second and third edges of one of the first and second faces. The first and second marks can include the same combination of densities in the data areas. Each sheet can further include a second machine-readable mark, a third machine-readable mark, and a fourth machine-readable mark, with the first and second machine-readable marks being aligned in a direction parallel to the first edges of each sheet, and with the third and fourth machine-readable marks also being aligned in a direction parallel to the first edges of each sheet. The first machine readable marks can be located in a margin area proximate a corner between the first and second edges of each sheet, with the second machine readable marks being located in a margin area proximate a corner between the second and third edges of one of the first and second faces or each sheet, with the third machine readable marks being located in a margin area proximate a corner between the third and fourth edges of each sheet, and with the fourth machine readable marks being located in a margin area proximate a corner between the first and fourth edges of one of the first and second faces of each sheet. The first, second, third, and fourth marks can include the same combination of densities in the data areas. The sheets can be at least about 4.5 thousandths of an inch thick. The sheets can be at least about 7 thousandths of an inch thick.

In another general aspect, the invention features a method of making paper sets that includes providing a print medium, cutting a plurality of sheets from the print medium, marking the print medium with machine-readable marks such that the marks are located on different ones of the sheets, and wherein the marks uniquely identify each of the sheets in the plurality of sheets, and assembling the plurality of sheets into a set. In preferred embodiments, the step of marking can employ a machine-readable marking code having a capability of producing at least about 10,000 marks. The step of marking can employ a machine-readable marking code having a checksum capability. The method can further include the step of stacking the assembled sheets. The method can further include the step of packaging the assembled sheets. The method can further include the step of packaging the assembled sheets, and repeating the steps of providing, cutting, marking, assembling, and packaging to create a plurality of sets of packaged sheets. The method can further include the step of distributing the sets of packaged sheets to different locations. The method can further include the step of distributing the assembled sheets to different locations. The step of marking can take place after the step of cutting.

In a further general aspect, the invention features a set of ink-jet printable proofing sheets that include a plurality of at least five sheets, each comprising a first printable face having a periphery including first, second, third, and fourth edges, wherein the first and third edges are disposed opposite each other on the first printable face, wherein the second and fourth edges are disposed opposite each other on the first printable face, and wherein the first face has properties resulting from a deposited ink drop print-enhancing treatment, a second face sharing the periphery and the first, second, third, and fourth edges of the first printable face, a first machine-readable mark located on one of the first and second faces and including a plurality of data areas of different densities, and a second machine-readable mark, wherein the first and second machine-readable marks are aligned in a direction parallel to the first edge.

In preferred embodiments, the first machine readable mark can be located in a margin area proximate a corner between the first and second edges, with the second machine readable mark being located in a margin area proximate a corner between the second and third edges of one of the first and second faces. The first and second marks can include the same combination of densities in the data areas. Each sheet can further include a second machine-readable mark, a third machine-readable mark, and a fourth machine-readable mark, with the first and second machine-readable marks being aligned in a direction parallel to the first edges of each sheet, and with the third and fourth machine-readable marks also being aligned in a direction parallel to the first edges of each sheet. The first machine readable marks can be located in a margin area proximate a corner between the first and second edges of each sheet, with the second machine readable marks being located in a margin area proximate a corner between the second and third edges of one of the first and second faces or each sheet, with the third machine readable marks being located in a margin area proximate a corner between the third and fourth edges of each sheet, and with the fourth machine readable marks being located in a margin area proximate a corner between the first and fourth edges of one of the first and second faces of each sheet. The first, second, third, and fourth marks can include the same combination of densities in the data areas.

In another general aspect, the invention features a method of making paper sets that includes providing a print medium, cutting a plurality of sheets from the print medium, marking the print medium with a set of first and second machine-readable marks such that one of the first marks and one of the second marks are each located on different ones of the sheets, wherein the first and second machine-readable marks each include a plurality of data areas of different densities, and are each located in a margin area along one edge of one of the sheets, and assembling the plurality of sheets into a set.

In preferred embodiments, the step of marking can employ a machine-readable marking code having a capability of producing at least about 10,000 marks. The step of marking can employ a machine-readable marking code having a checksum capability. The method can further include the step of stacking the assembled sheets. The method can further include the step of packaging the assembled sheets. The method can further include the step of packaging the assembled sheets, and further including repeating the steps of providing, cutting, marking, assembling, and packaging to create a plurality of sets of packaged sheets. The method can further include the step of distributing the sets of packaged sheets to different locations. The method can further include the step of distributing the assembled sheets to different locations. The step of marking can take place after the step of cutting.

In a further general aspect, the invention features a printing method that includes detecting a first mark on a first printable sheet of a first type and a first size, with the mark identifying a manufacturing characteristic of the first sheet. The method also includes accessing a first stored status identifier corresponding to information expressed by the first mark, and determining whether to print on the first printable sheet based on the first stored status identifier. The method further includes detecting a second mark on a second printable sheet of the same type and size as the first sheet, wherein the mark identifies a manufacturing characteristic of the second sheet, accessing a second stored status identifier corresponding to information expressed by the second mark, and determining whether to print on the second printable sheet based on the second stored status identifier.

In preferred embodiments, the method can further include the steps of providing a local copy of the first identifier via a communication network and providing a local copy of the second identifier via the communication network. The step of providing a local copy of the second identifier can take place after the step of accessing a first identifier. The step of determining can determine whether to print a proof. The steps of detecting can detect lot codes. The steps of detecting can detect individual sheet identification marks.

In another general aspect, the invention features a printing method that includes printing on a sheet having a preprinted individual sheet identification mark, storing characteristics of the step of printing, and using information represented in the mark to access the stored characteristics after the step of storing. In preferred embodiments, the step of using can take place through an inter-city communication network.

In a further general aspect, the invention features a printing method that includes detecting a first preprinted individual sheet identification mark on a sheet, printing on the sheet having the first preprinted individual sheet identification mark, again detecting the first preprinted individual sheet identification mark on a sheet, and refraining from printing on the sheet for which the first preprinted individual sheet identification mark was detected in the step of again detecting.

In another general aspect, the invention features a printing method that includes detecting a first preprinted individual sheet identification mark on a sheet, printing on the sheet having the first preprinted individual sheet identification mark, detecting a second preprinted individual sheet identification mark on a sheet, and issuing an alert if the sheet identification marks detected in the steps of detecting are out of sequence.

In a further general aspect, the invention features a printing method that includes detecting a first preprinted individual sheet identification mark on a sheet, printing on the sheet having the first preprinted individual sheet identification mark, updating a sheet counter based on the step of detecting, detecting further preprinted individual sheet identification marks on further sheets, printing on the further sheets having the further preprinted individual sheet identification marks, and updating the sheet counter based on the steps of detecting further preprinted individual sheet identification marks on further sheets. In preferred embodiments, the method further includes the step of issuing certification notices for the steps of printing.

In one general aspect, the invention features a certified proofing method that includes receiving a printable sheet and automatically detecting at least one feature of at least one component of a proofing process bearing on its quality. The method also includes automatically evaluating at least one result of the step of detecting, printing print data on the printable sheet, and generating a certification notice for the printable sheet in response to a positive electromagnetic result signal from the step of evaluating.

In preferred embodiments, the step of detecting can detect a feature of a consumable component of the proofing process. The step of detecting can detect at least a first mark area disposed on the sheet. The step of detecting can detect an ink source certification input signal. The ink certification input signal can express ink cartridge identification information, ink expiration information, and/or ink usage information. The step of detecting can detect a calibration certification input signal. The step of detecting can detect a profile certification input signal. The step of detecting can detect a profile certification signal that results from a privileged profile approval signal stored with a profile for the sheet. The step of detecting can detect a feature of each of a plurality of components of the proofing process bearing on quality of the proofing process. The step of detecting can detect a feature of each of a plurality of consumable components of the proofing process. The step of detecting can detect a plurality of features of at least one component of the proofing process bearing on quality of the proofing process. The step of detecting can detect both at least a first mark area disposed on the sheet and an ink source certification input signal. The method can further include the step of printing at least one test strip on the printable sheet in response to a positive electromagnetic result signal from the step of evaluating results of the step of detecting. The step of printing print data can only take place in response to a positive result in the step of evaluating results of the step of detecting. The method can further include a step of printing a disclaimer on the printable sheet in response to a negative result in the step of evaluating. The of generating a certification notice can include printing the certification notice on the printable sheet.

In another general aspect, the invention features a certified proofing method that includes receiving a printable sheet, automatically detecting at least one feature of at least one consumable component of a proofing process bearing on quality of the proofing process, automatically evaluating at least one result of the step of detecting, printing print data on the printable sheet in response to a positive result of the step of evaluating results of the step of detecting, and refraining from printing the print data on the printable sheet in response to a negative electromagnetic result signal from the step of evaluating results of the step of detecting.

In preferred embodiments, the step of detecting can detect at least a first mark area disposed on the sheet. The step of detecting can detect an ink source certification input signal. The ink certification input signal can express ink cartridge identification information, ink expiration information, and/or ink usage information. The step of detecting can detect a calibration certification input signal. The step of detecting can detect a profile certification input signal. The step of detecting can detect a feature of each of a plurality of consumable components of the proofing process. The step of detecting can detect a plurality of features of at least one component of the proofing process bearing on quality of the proofing process.

In a further general aspect, the invention features a proofing method that includes receiving a printable sheet, detecting alignment information from a plurality of separate marks disposed in a peripheral area of a printable side of the sheet and content information from at least one of the marks, evaluating the content detected in the step of detecting, evaluating the alignment information detected in the step of detecting, and printing on the printable sheet in response to a positive result from the step of evaluating alignment and a positive result from the step of evaluating the content.

In preferred embodiments, the step of evaluating content can evaluate the direction of the changes in intensity for each of a series of markings in the mark area. The step of evaluating content can evaluate the intensity of markings in two dimensions. The method can further include the step of refraining from printing on the printable sheet in response to a negative result in the step of evaluating content. The step of detecting can rely on wavelengths outside of the visible range, such as ultraviolet wavelengths. The step of detecting can rely on cyan mark areas. The step of detecting can detect a substrate sequence number. The step of detecting can detect a substrate lot code. The step of detecting can detect an error-correcting code. The step of detecting can detect encrypted information and the method can further include a step of decrypting the encrypted information.

In another general aspect, the invention features a proofer that includes a proofing engine, a substrate certification sensing subsystem, an ink certification sensing subsystem, and a certification engine responsive to signals from the substrate certification sensing subsystem and the ink certification sensing subsystem, and including a certification output.

In preferred embodiments, the certification output can be provided to the proofing engine. The certification engine can include proofing engine disabling logic with the calibration output of the certification engine being a disable output. The certification engine can include certification mark print request logic responsive to signals from the substrate certification sensing subsystem and the ink certification sensing subsystem, with the calibration output of the certification engine being a certification notice print request output.

In a further general aspect, the invention features a certified proofer that includes at least one quality certification signal source responsive to at least one component of a proofing process carried out by the proofer, a certification engine responsive to signals from the certification subsystem, and certification signal issuance logic responsive to the certification engine.

In preferred embodiments, the certification signal issuance logic can include a data output provided to a data input of a proofing engine of the proofer. The certification signal issuance logic can include an enable output provided to an enable input of a proofing engine of the proofer. The certification input signal source can be a sheet sensing subsystem. The certification input signal source can be an ink sensing subsystem. The certification input signal source can be a profile reporting subsystem. The certification input signal source can be a calibration reporting subsystem. The proofer can further include shared storage responsive to the certification signal issuance logic.

In another general aspect, the invention features a certified proofer that includes means for automatically detecting at least one feature of at least one component of a proofing process bearing on quality of the proofing process, means for automatically evaluating at least one result of the step of detecting, and means for generating a certification notice for a printable sheet in response to a positive electromagnetic result signal from the means for evaluating results.

In a further general aspect, the invention features a certified proofer that includes means for automatically detecting at least one feature of at least one component of a proofing process bearing on quality of the proofing process, means for automatically evaluating at least one result of the step of detecting, and means for refraining from printing print data on a printable sheet in response to a negative electromagnetic result signal from the means for evaluating.

In a further general aspect, the invention features a certified proofer that includes means for detecting alignment information from a plurality of separate marks disposed in a peripheral area of a printable side of the sheet and content information from at least one of the marks, means for evaluating the content detected in the step of detecting, and means for evaluating the alignment information detected in the step of detecting.

BRIEF DESCRIPTION OF THE DRAWINGS

FIG. 2 is a diagram illustrating substrate sensing subsystem elements for the system of FIG. 1;

FIG. 3 is a diagram of a substrate certification mark for the certifiable substrate of FIG. 5 and corresponding calibration signal waveforms generated by the substrate certification subsystem elements of FIG. 2 in response to the certification mark;

FIG. 4, is a diagram of a portion of the certification mark of FIG. 3 in a misaligned feed position and corresponding calibration signal waveforms;

DETAILED DESCRIPTION OF AN ILLUSTRATIVE EMBODIMENTS

Figure 1:
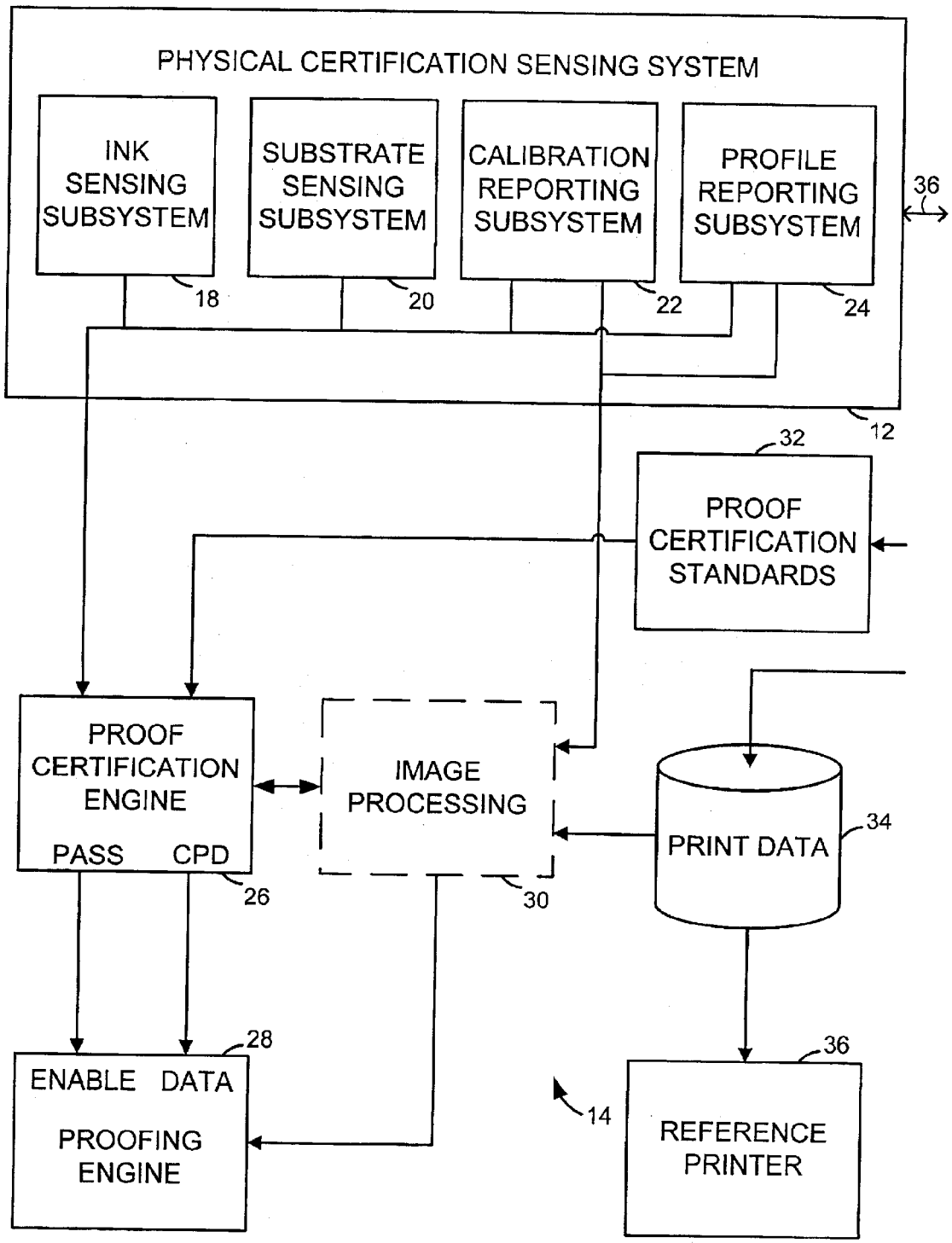
FIG. 1 is a block diagram of a certified proofing system according to the invention.

Referring to FIG. 1, a certified proofing system 10 according to the invention includes a physical certification sensing system 12 and a proofing subsystem 14 that are used to create proofs of print jobs to be printed on a reference printer or "press" 36. The proofing system is preferably implemented at least in part as a physical proofing plant that can take the form of an enclosed standalone machine built on a frame that supports circuitry and mechanical elements. The physical proofing plant also preferably has a computer interface enabling it to be connected to one or more remote computers.

The proofing subsystem 14 includes a proof certification engine 26, a proofing engine 28, an image processing engine 30, proof certification standard storage 32, and print data storage 34. Although the physical certification sensing system and the proofing subsystem are preferably implemented within the physical proofing plant, some or all of the functionality of these elements may be located in a computer that is remote from the physical proofing plant. In addition, while the breakdown shown in FIG. 1 is useful in understanding the invention, one of ordinary skill in the art will understand that useful systems could be devised with very different breakdowns using mechanical elements, dedicated circuits, and/or programmed processor(s) in various combinations. Functions of the blocks shown in the figures could be therefore redistributed or otherwise altered, and non-essential functions or elements could be omitted. For example, while the functions of the image processing engine 30 are shown as centralized in FIG. 1, these functions could be split into portions that are performed within the certified proofing systems and portions that are performed by external processors.

The proof certification standard storage 32 stores a series of standards to which proofs generated by the proofing system must adhere. These can include qualitative values, (i.e., test required/not required), or quantitative values (e.g., maximum color deviation range, or alignment tolerances). They are preferably set by the manufacturer or a privileged supervisory user and cannot thereafter be modified or tampered with, although it may be useful to create different sets of standards for different types of proofs. And while FIG. 1 shows the standard storage as a single block, its function can be distributed, with some of the standards even being hardwired, implicit in functional calibration code, or otherwise specified.

The physical certification sensing system 12 includes an ink sensing subsystem 18, a substrate sensing subsystem 20, a calibration reporting subsystem 22, and a profile reporting subsystem 24, which each have an output operatively connected to a certification input of the proof certification engine 26. The proof certification engine also includes an input operatively connected to a data port of the proof certification standard storage 32, a pass output operatively connected to an enable input of the proofing engine 28, and a certified print data output (CPD) operatively connected to a data input of the proof certification engine 26. The proofing engine in this embodiment is a high-resolution (e.g., 1200 or 2400 DPI), four-color (e.g., CMYK), continuous inkjet engine, although other types of engines could also be used, such as a six-color inkjet engine or a drop-on-demand (DOD) engine. Suitable print engine technology is described in a copending applications entitled INKJET PROOFING WITH MATCHED COLOR AND SCREEN RESOLUTION, filed on Sep. 24, 2001 as U.S. application Ser. No. 09/962,808, and PRINT PROOFING WITH COLOR AND SCREEN MATCHING, filed on Sep. 22, 2000, as U.S. patent application Ser. No. 09/667,900, which are both herein incorporated by reference.

The calibration reporting subsystem 22 and the profile reporting subsystem 24 also have outputs operatively connected to an input of the image processing engine 30. This image processing engine 30 can be implemented as a local processor such as an integrated digital signal processor, although some or all if its functionality can also be provided for by other equipment, such as a networked personal computer. It has an input operatively connected to source of print data 34, such as a print data buffer, and outputs operatively connected to inputs of the proof certification engine 26 and the proofing engine 28. The image processing engine can perform a variety of functions, such as raster image processing, screening, color matching to a reference target, and/or color calibration.

The certified proofing system 10 can be operatively connected to a public or private network connection, such as an Internet connection. This connection can include a simple TCP/IP interface between the physical certification sensing system and the Internet 36. It can also include other types of connections between other parts of the systems and the network, and these may be more indirect or intermittent. For example, the proofing system may include a dedicated modem or a local communication interface to a personal computer that is connected to the Internet.

Figure 5:
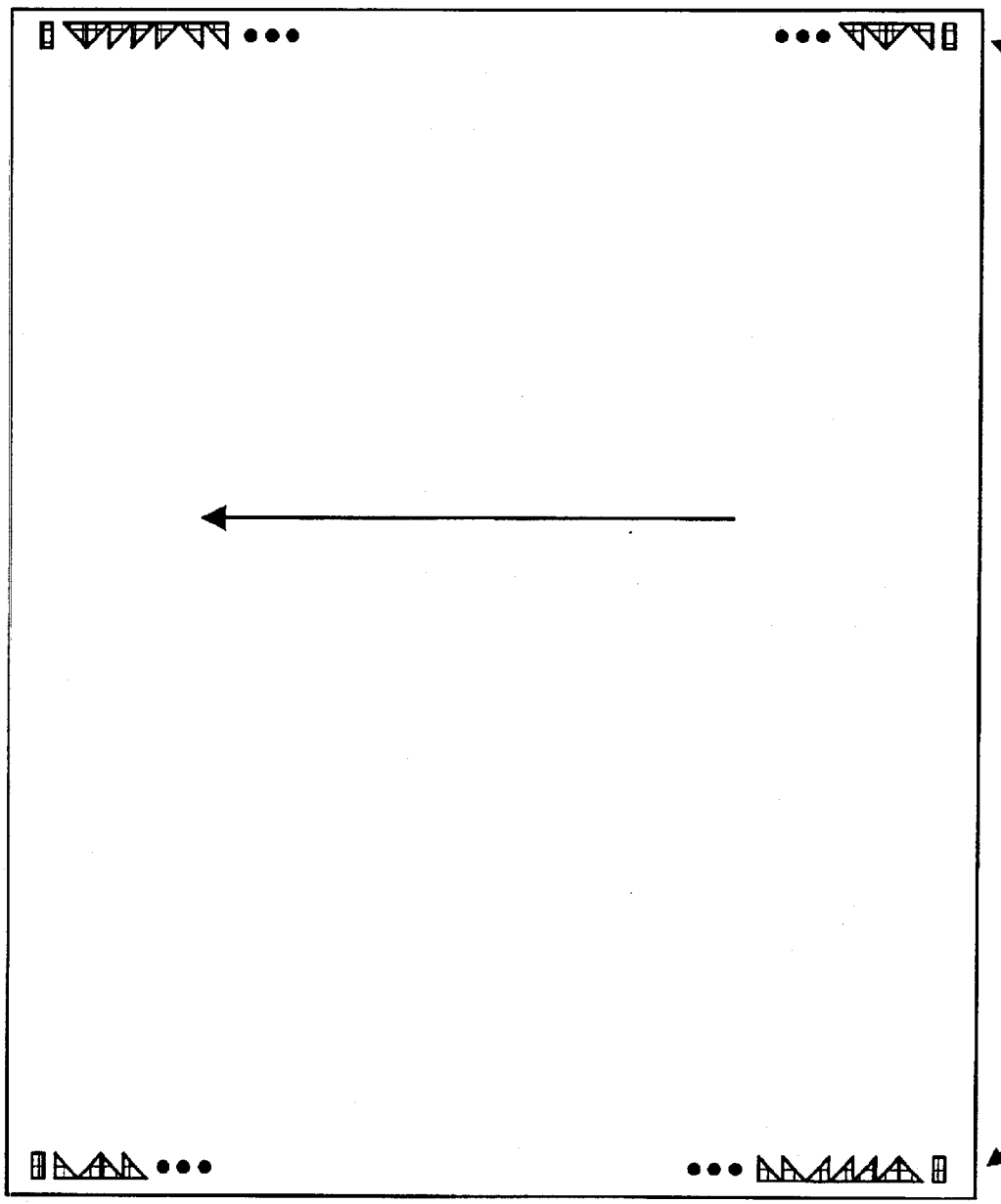
FIG. 5 is a diagram of a blank certifiable proofing substrate for the system of FIG. 1.

Referring to FIGS. 2 and 5, the substrate sensing subsystem 20 includes a detector 40, such as a phototransistor, and a source 42, such as a light emitting diode (LED). A mask 44 with a slot 46 is positioned in an optical path between the source and the detector in the vicinity of a portion of the feed path of a certifiable proofing substrate 48 such that the slot is perpendicular to the feed direction of the substrate. This mask preferably defines a detection strip a short distance from one edge of the substrate along the length of the substrate. This allows it to detect a mark (50A and/or 50B) along one or both edges of the substrate as it advances into the proofing engine. The source is positioned to illuminate the mark and thereby improve detection of the mark. In one embodiment, the detector and the source are designed to detect marks that include a component that is detectable outside of the visible wavelength range, such as in the infrared or ultraviolet spectral regions.

Referring to FIG. 3, each of the marks (e.g., 50A) is made up of a series of shapes, which can include triangles and rectangles. In the embodiment described, a first of the shapes is a rectangle 52A, which acts as a start detection marking. Following the start detection marking are a series of dual-purpose triangular markings 52A, 52B, . . . 52X. The mark concludes with a second rectangle 52Y, which acts as an end detection marking. The triangular markings in this embodiment are oriented in one of two different directions and can be characterized as forward (pointing along the feed direction) or reverse (pointing against the feed direction). Markings in one orientation are symmetrical to those in the other orientation with respect to a line in a direction perpendicular to the feed direction and in the plane of the substrate.

As the mark 50A passes the detector during feeding of the certifiable proofing substrate 48, the detector detects corresponding changes in intensity of the radiation it receives form the surface of the substrate. The mark can cause these changes by reducing the amount radiation reflected from the substrate toward the detector, such as in the case of dark markings on a light background. The mark can also cause changes by increasing the amount of radiation received by the detector, such as in the case of markings made with a fluorescent ink that are excited by ultraviolet radiation.

When the mark 50A on the certifiable proofing substrate passes in front of the detector 40, it first transduces the radiation it receives to provide a rectangular boxcar pulse 56A on its output signal 54 followed by a short blank interval. This part of the signal corresponds to the start detection marking 52A and a short blank area following it, and is used to confirm detection of the start of the mark. The detector then provides a series of slanted boxcar pulses that each correspond to one of the triangular markings. These pulses are rectangular except that they have either slanted leading edges or slanted trailing edges depending on the orientation of the triangular markings. Pulses that correspond to forward triangles have slanted trailing edges and pulses that correspond to reverse triangles have slanted leading edges. The pulses also lead the center of the forward triangular marks, while they lag the center of the reverse triangular marks.

The marks can convey information about both the substrate itself as well as how the substrate is being fed. As shown in FIG. 4, there is a relationship between changes in the pulses and the substrate feed progression that can be used to detect different types of feed errors. If the substrate follows an oblique path 58 that deviates by a fixed angle from the desired feed path, for example, successive pulses 56E, 56D, 56C will have progressively changing widths as the detector scans corresponding triangles 52E, 52D, 52C at different heights. The different widths of these pulses can then be detected by the substrate sensing subsystem 22.

Figure 6:
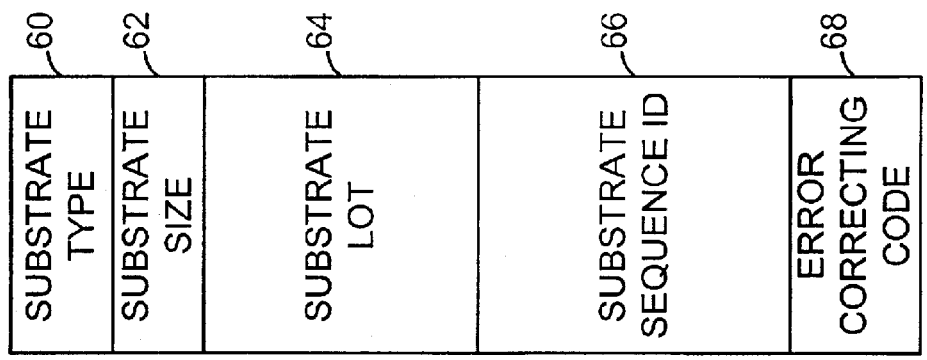
FIG. 6 is a diagram of a region breakdown for the calibration mark of FIG. 3 on the certifiable substrate of FIG. 5.
Figure 7:
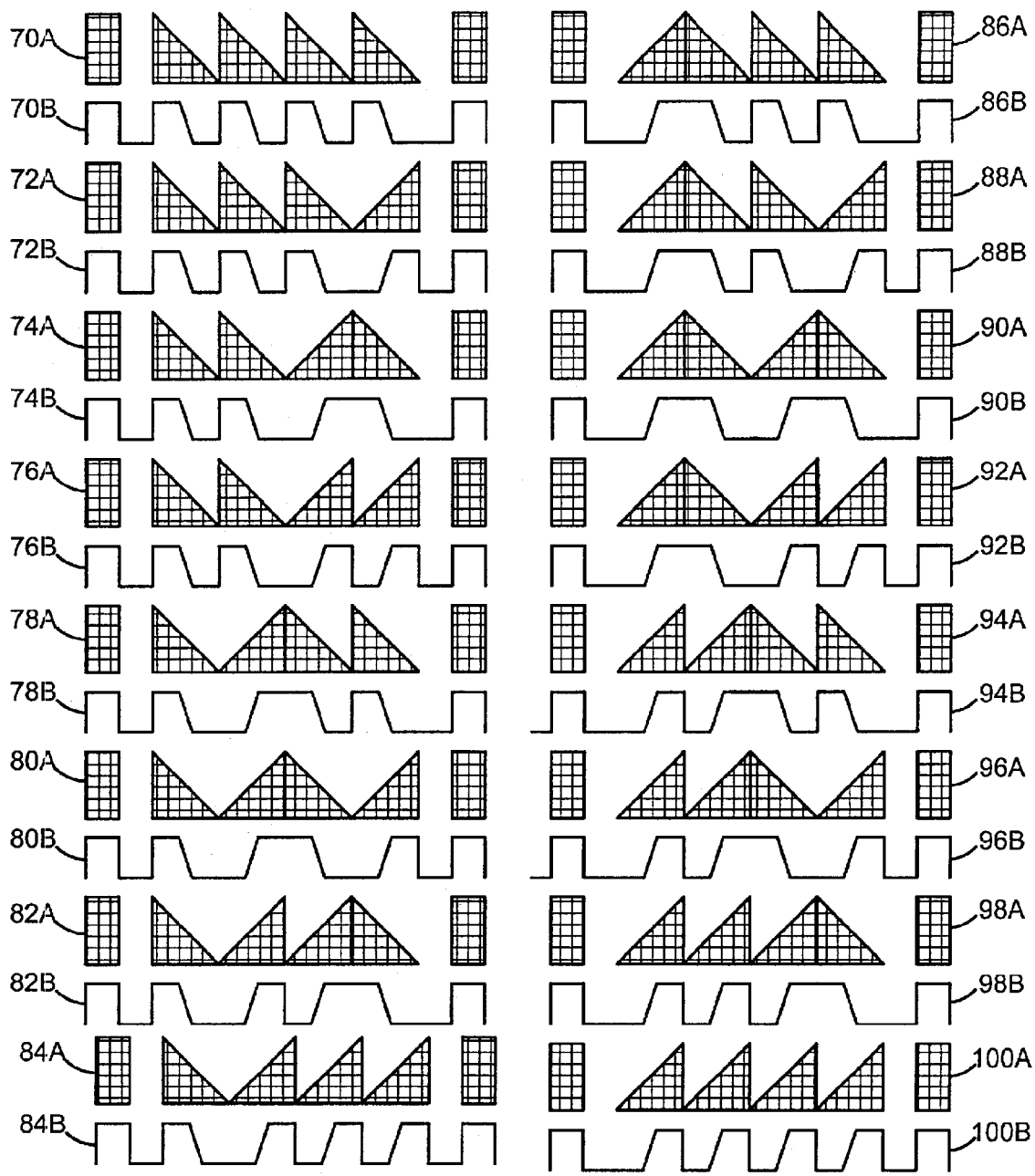
FIG. 7 is an encoding diagram for the calibration mark of FIG. 3 on the certifiable substrate of FIG. 5.

Referring to FIGS. 6 and 7, the orientation of the triangles can also provide information about the substrate being fed into the proofing system, which can allow for the correction of other errors and/or the improvement of proofing system output, as discussed in more detail below. One scheme that can be used is summarized in Table 1 and presented in FIG. 7, where F represents a forward triangle and R represents a reverse triangle.

TABLE 1

| Number Number | Orientations Orientations | Ref. Desig. Ref. Desig. | Number Number | Orientations Orientations | Ref. Desig. |
|---|---|---|---|---|---|
| 0 | FFFF | 70A | 8 | RFFF | 86A |
| 1 | FFFR | 72A | 9 | RFFR | 88A |

TABLE 1-continued

| Number Number | Orientations Orientations | Ref. Desig. Ref. Desig. | Number Number | Orientations Orientations | Ref. Desig. |
|---|---|---|---|---|---|
| 2 | FFRF | 74A | 10 | RFRF | 90A |
| 3 | FFRR | 76A | 11 | RFRR | 92A |
| 4 | FRFF | 78A | 12 | RRFF | 94A |
| 5 | FRFR | 80A | 14 | RRFR | 96A |
| 6 | FRRF | 82A | 15 | RRRF | 98A |
| 7 | FRRR | 84A | 16 | RRRR | 100A |

In the present embodiment, the markings each include two rectangles measuring 4.3 mm wide by 8.7 mm tall surrounding right triangles that are 8.7 mm wide by 4.3 mm tall. In other embodiments, the markings can have different dimensions and the marks can have different numbers of markings. It may also be possible to use two or more orientations of other shapes, or even different combinations of orientations of triangles. In addition, the shapes need not be distinct or continuous, and the color, darkness, or other attributes of shapes or other types of markings can also be used, as long as distinguishable signals are obtained. Suitable marks can be applied using general-purpose industrial non-contact marking printers located above the web in the paper conversion process. Such printers are available, for example, from Imaje S. A. of Bourg lès Valences (e.g., model Jamie 1000).

Referring to FIG. 6, the marks 50A, 50B can each convey a variety of information about the substrate. At least some of this information has a bearing on the quality of a proof to be printed by the system. The information provided in this embodiment is summarized in Table 2.

TABLE 2

| Field | Length | Ref. | Description |
|---|---|---|---|
| Substrate Type | 4 | 60 | Specifies a type that has predetermined properties such as substrate type (e.g., paper, transparency) and coating type |
| Substrate Size | 2 | 62 | Dimensions of the substrate |
| Substrate Lot | 8 | 64 | Specifies which process run made the substrate |
| Substrate Sequence ID | 14 | 66 | Each substrate numbered consecutively from 1 to 16,384, at which point sequence begins again |
| Error Correcting Code | 1–10 | 68 | Code that permits detection and/or correction of errors in the reading of the mark, such as a parity code, cyclic redundancy code or, a Hamming code |

Note that in this embodiment two identical, but reversed marks 50A, 50B are provided in order to allow the certifiable substrate 48 to be inserted in either direction, as long as it is not inserted upside-down. Two detectors can also be used to detect both of the marks and thereby derive information about substrate shrinkage or asymmetrical feed problems. Cyan ink is used for the marks in this embodiment, but other colors of ink, including inks that include invisible components or that are completely invisible, could also be used.

Some or all of the data in the mark can be encrypted and/or digitally signed. Encrypting the data can be useful in preventing tampering with the mark. And by digitally signing their media sheets, media manufacturers can provide end users with a highly reliable confirmation of their quality and provenance. The mark data are preferably encrypted and/or signed with a public key encryption method. This type of method can use a private key during manufacture to encrypt the information, and a public key in the printer to decrypt and/or verify the information.

Figure 8:
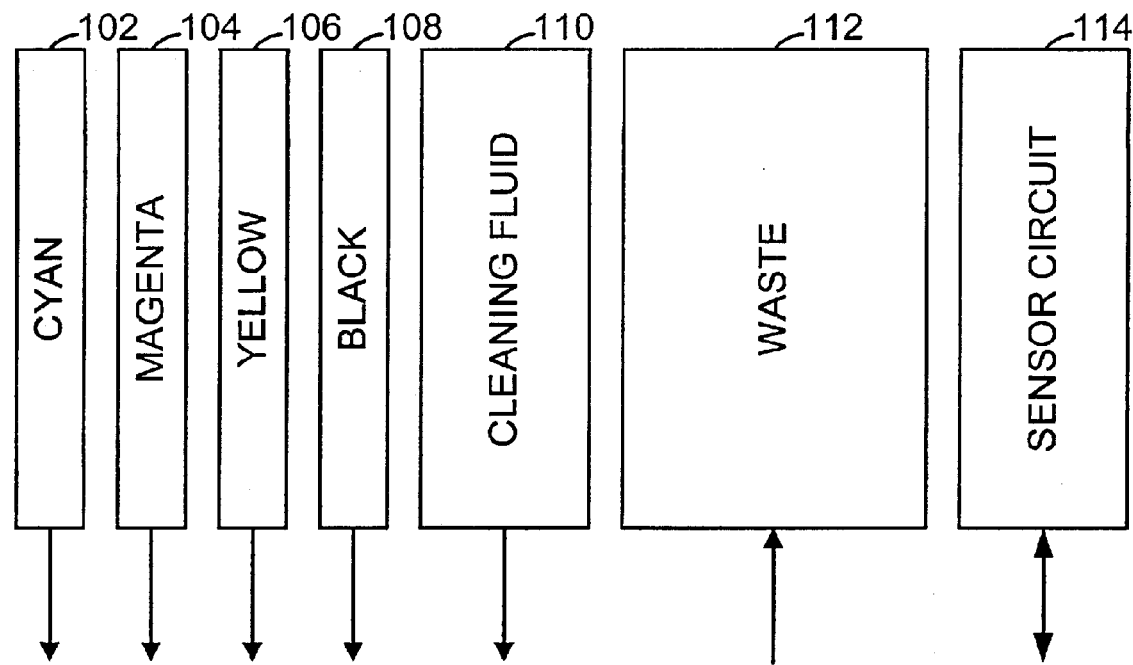
FIG. 8 is a diagram of elements of an ink sensing subsystem for the system of FIG. 1.
Figure 9:
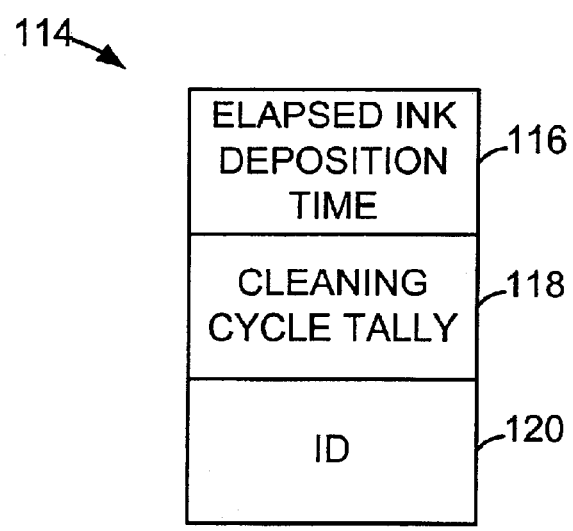
FIG. 9 is a storage region breakdown for the ink sensing subsystem of FIG. 8.

Referring to FIGS. 8 and 9, the ink sensing subsystem 18 can include a non-volatile tracking unit 114. This unit is preferably mechanically coupled to an ink cartridge or fluid management system that are operative to dispense a set of inks. In the present embodiment, a fluids are managed by a fluid management system, which includes a cyan reservoir 102, a magenta reservoir 104, a yellow reservoir 106, a black reservoir 108, a cleaning fluid reservoir 110, a waste reservoir 112, and the tracking unit 114.

The tracking unit 114 includes a number of storage area fields and a data port. The storage fields include an elapsed ink deposition time field 116, a cleaning cycle tally 118, and an ID 120. These fields are preferably accessed in a Write-Once-Read-Many (WORM), or at least non-volatile fashion, to prevent deliberate tampering with or accidental resetting of the cartridge. The ID can be a simple number that is accessed directly, or can take the form of a digital certificate or the like that can be interrogated in a more secure manner. Although the ID can implicitly or explicitly encode a date for ink dating purposes, a separate date field could also be provided. Modules suitable for use as tracking unit are available from Dallas Semiconductor of Dallas, Tex. The certified proofing system can require the presence of the tracking unit before any printing can take place. A suitable fluid management system with a proofing system interlock is described in more detail in a copending application entitled FLUID MANAGEMENT SYSTEM filed on the same date as this application and herein incorporated by reference.

Figure 10:
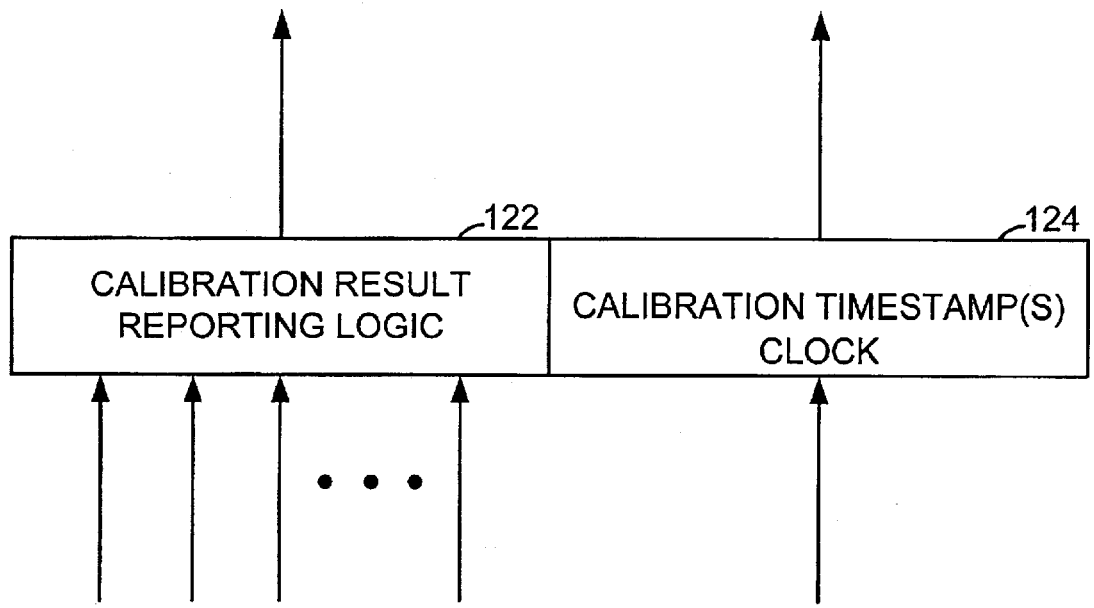
FIG. 10 is a block diagram of elements of a calibration reporting subsystem of the system of FIG. 1.

Referring to FIG. 10, the calibration reporting subsystem 22 includes one or more calibration sensor signal inputs. These inputs are from sensors, sensing circuits, and/or calibration logic that monitor all significant calibration operations performed by the certified proofing system 10. The calibration reporting subsystem can include a calibration result reporting module 122, which routes, aggregates, and/or stores sensing and/or calibration signals and/or results, and a timestamp reporting module 124, which provides calibration timestamp information.

In this embodiment, there are two types of calibration. The first type is a software-based calibration that uses color correction information to compensate for errors in the system, such as drifts or offsets. The color correction information is derived from manual spectrophotometer measurements and is used by the image processing engine 30 in correcting color output of a particular machine. The second type of calibration is known as hardware calibration, and is performed to ensure that all drops are of the same size.

Figure 11:
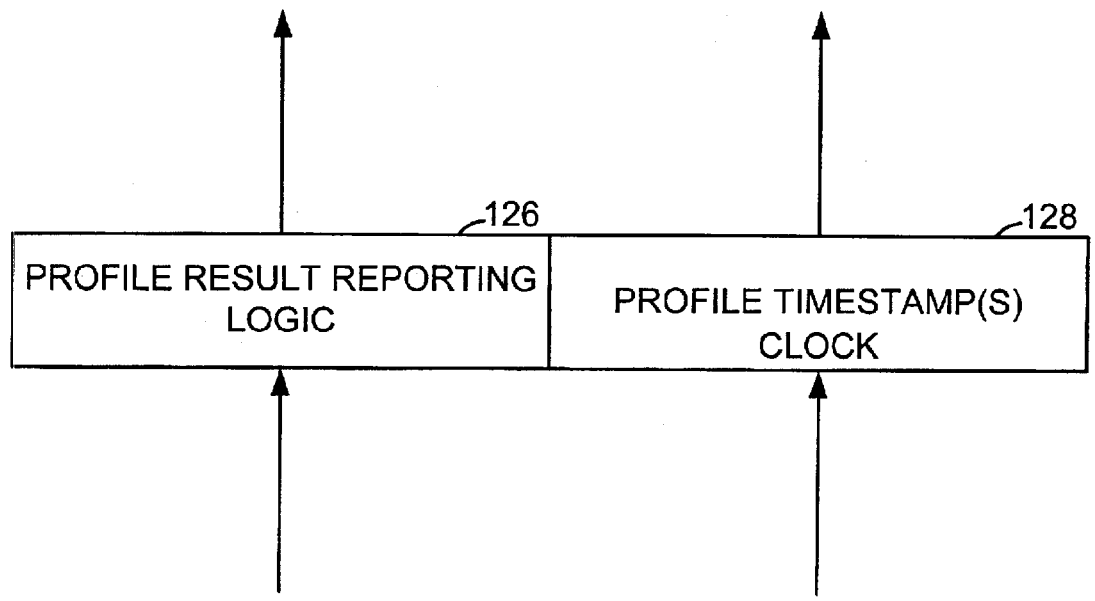
FIG. 11 is a block diagram of a profile reporting subsystem of the system of FIG. 1.

Referring to FIG. 11, the profile reporting subsystem 24 can include a profile reporting module 126, which routes, aggregates, and/or stores profile signals and/or results, and a timestamp reporting module 128, which provides profile timestamp information. The profile signals reported on by the profile reporting system include color correction information designed to enable the proofer's process to match the reference printer's output.

Figure 12:
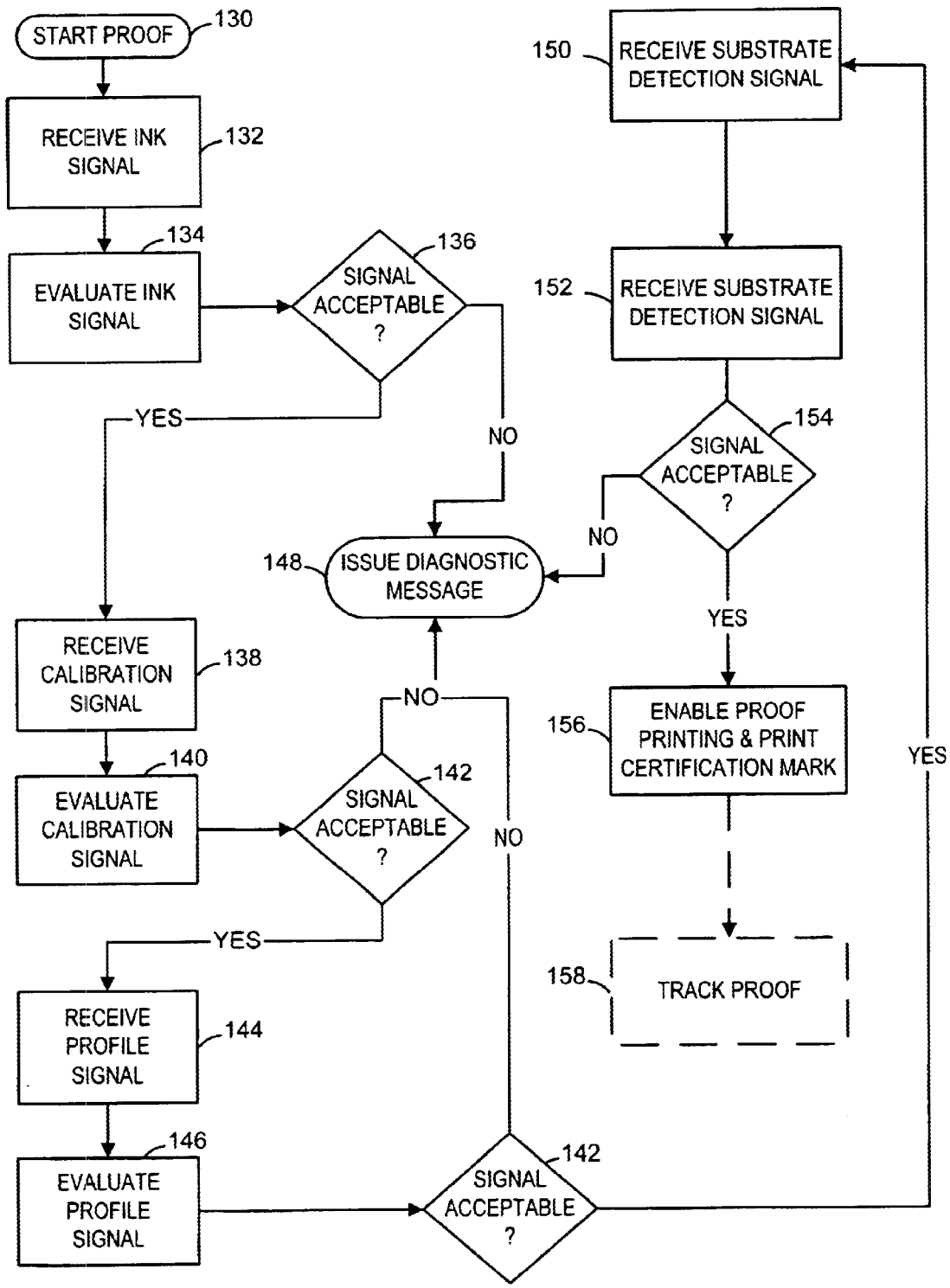
FIG. 12 is a flowchart illustrating the general operation the certified proofing system of FIG. 1.

In operation, referring to FIG. 12, proofing begins with the reception by the certified proofing system 10 of a proof start command that specifies a media type, a profile or reference printer, and an ink type (step 130). This proof start command can be specified by an operator or embedded in a data file sent to the proofer. Where multiple files are received, the proofer can queue them to aggregate jobs with similar parameters. The profile is identified by a profile tag, which is matched to a profile to be used by the proofer. Creation of a new tag or modification of a profile can be configured to require password-enforced supervisory authority.

Figure 13:
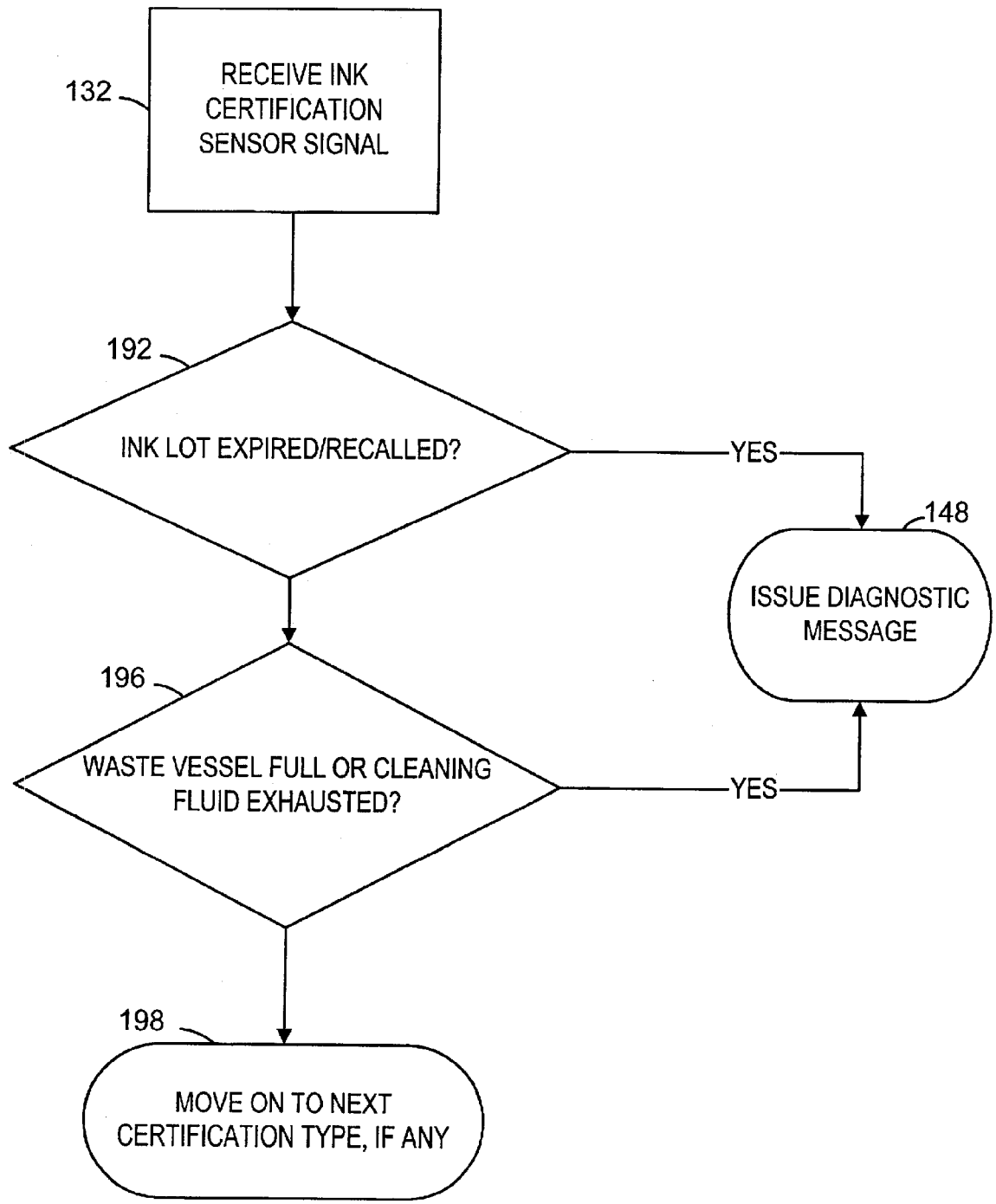
FIG. 13 is a flowchart illustrating the operation of the proof certification engine for the ink sensing system of FIG. 7.

After the proof certification engine 26 has received the proof start command, it receives an ink signal (step 132). In the embodiment presented, the ink signal takes the form of a set of fields retrieved from the tracking unit 114 in the ink sensing subsystem 18. The ink signal is then evaluated (step 134), beginning with the portion of the signal corresponding to the ID field 120, which is evaluated to determine if the ink lot has expired or been recalled (step 192) (see also FIGS. 9 and 13). If the ink lot has expired or has been recalled, the system issues a diagnostic message (step 148) to the operator and ceases its current run. This diagnostic message can take any suitable form, such as an on-screen alert, a sound, and/or an illuminated LED, and it preferably identifies or explains the failure.

If the ink lot has not expired, the certification engine 26 can then evaluate the signal to determine whether the waste vessel is full, or the cleaning fluid is exhausted (step 196). If they are not, operation can move on to a next certification type (step 198). If the waste vessel is full, or if the cleaning fluid is exhausted, the system issues a diagnostic message to the operator (step 148). This message is preferably qualitatively different from the expired lot message, but both messages may simply take the form of a request to replace the proofing system's cartridge. Note that in this embodiment monitoring the waste level will provide a good indication of the amount of ink left in the system because the waste vessel is at least close in volume to the total volume of the ink reservoirs, and because ink usage is independent of content in a continuous ink-jet system that does not recycle ink. Other types of proofing engines may require that the ink sensing subsystem monitor a somewhat different set of fields. As with steps in other sequences presented in this application, the detection steps performed by the ink sensing subsystem can be performed in any order or event combined, if appropriate.

Referring to FIG. 12, if the ink sensing subsystem 18 determines that the ink signal is acceptable (step 136), the proof certification engine receives a calibration signal (step 138) from the calibration reporting subsystem 22. This signal can convey a variety of calibration information from a variety of calibration sources. The calibration signal provided by the calibration reporting subsystem can also include a timestamp that indicates when calibration operations were last performed by the calibration sources. The timestamp can be a single number or include information fields reflecting information about the different calibration sources. The generation of the calibration information by calibration sources depends on the particular needs of a system and a variety of approaches are well known to those of ordinary skill in the art.

The proof certification engine evaluates the calibration signal (step 140) both for the quality of its results and for its freshness, and determines whether the signal is acceptable (step 142). If the signal is unacceptable, the system issues a diagnostic message (step 148), which preferably identifies the nature of the calibration failure, and ceases its current run.

If the proof certification engine 26 determines that the calibration signal is acceptable, it receives a profile signal from the profile reporting subsystem (step 144). The proof certification engine evaluates the profile signal and uses it to evaluate the quality, integrity and/or freshness of the machine's profile, and may also evaluate whether the profile was approved for the current printing application by detecting one or more approval flags in the profile (step 146). If the results are unacceptable, the certification engine can issue profile regeneration instructions and reevaluate a regenerated profile. If an acceptable profile cannot be obtained, the system issues a diagnostic message, which preferably identifies the nature of the profile failure, and ceases its current run (step 148).

Figure 14:
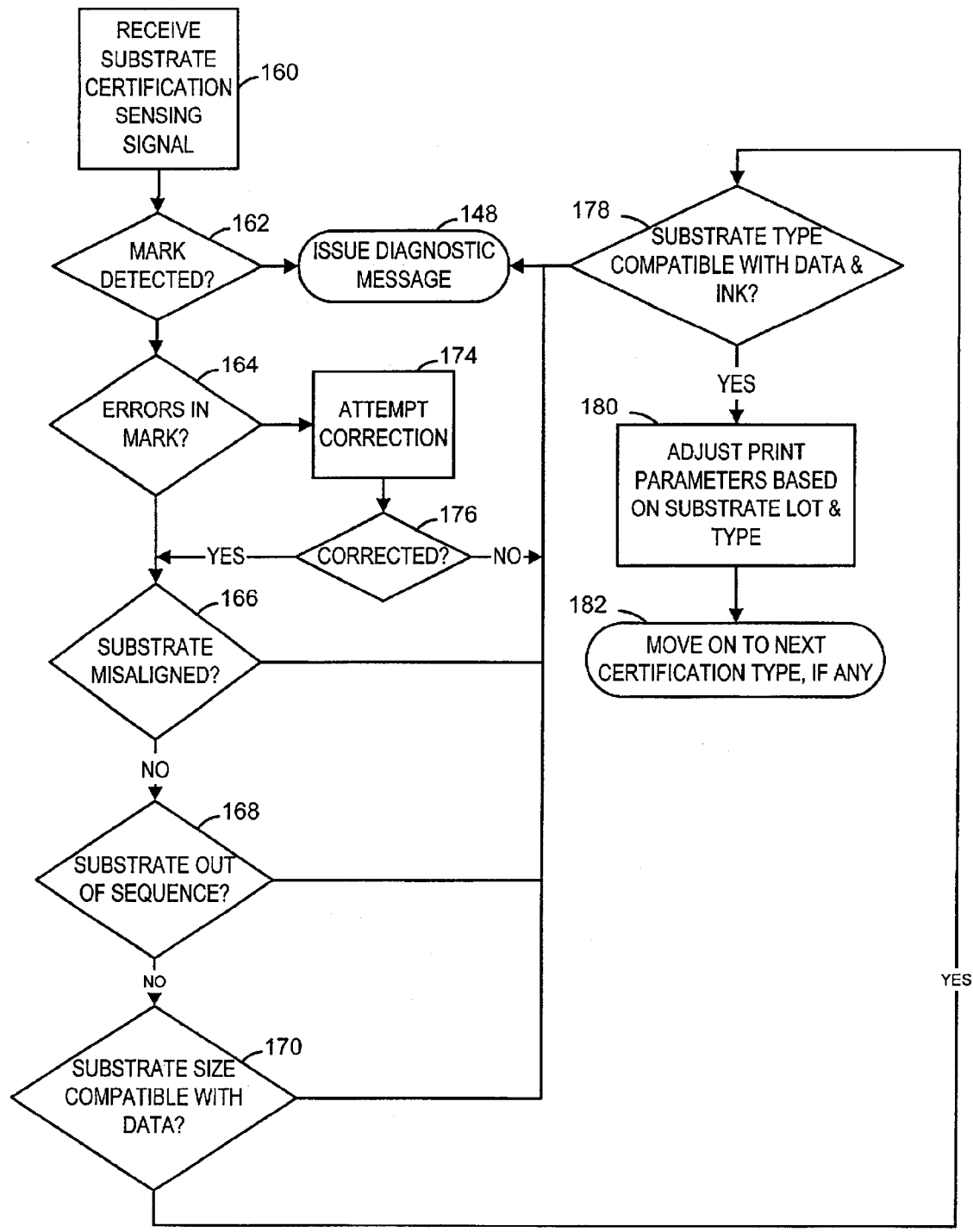
FIG. 14 is a flowchart illustrating the operation of the proof certification engine for the substrate sensing system of FIG. 7.
Figure 15:
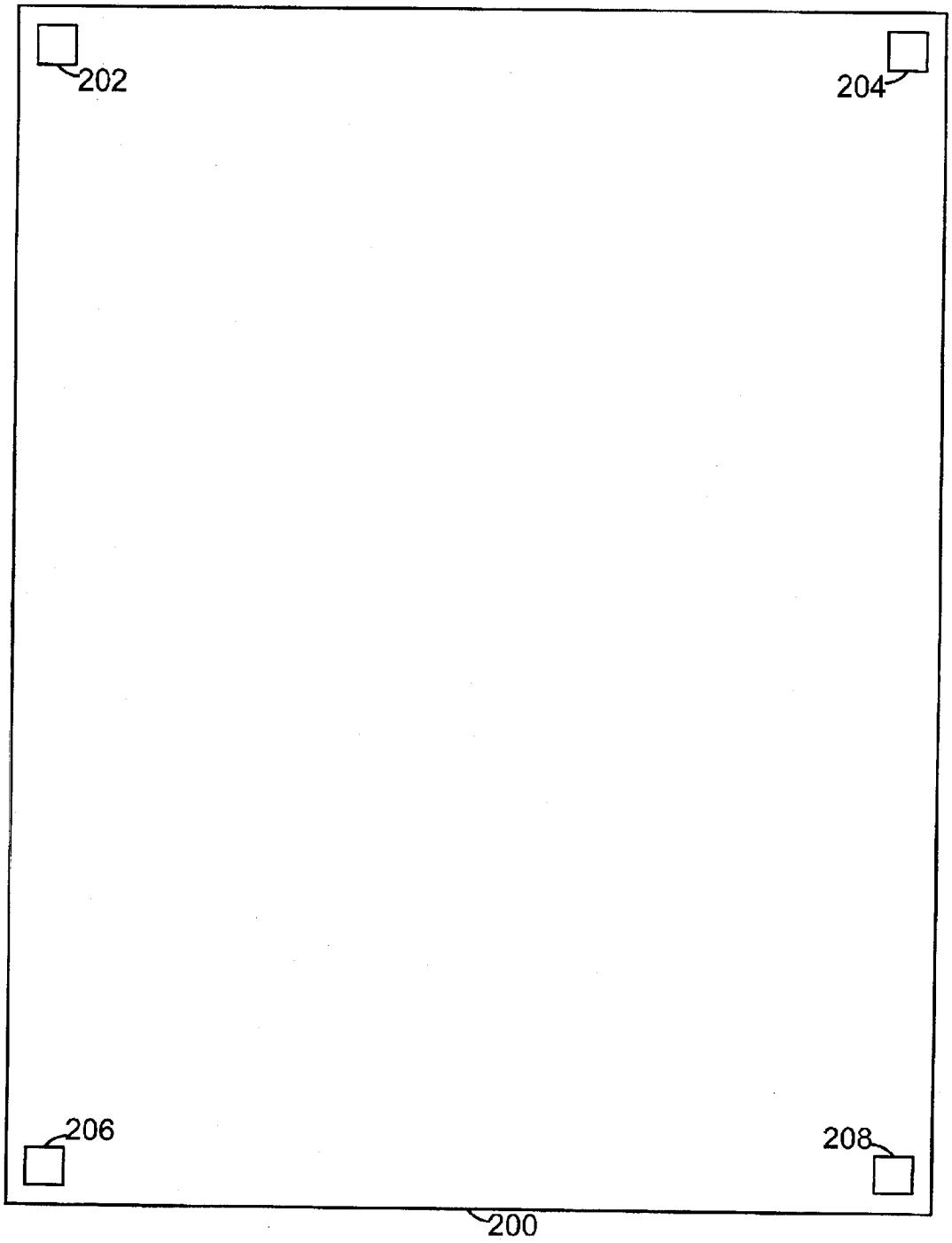
FIG. 15 is a diagram of another blank certifiable proofing substrate for the system of FIG. 1.

Referring also to FIG. 14, if the proof certification engine 26 determines that the ink, calibration, and profile signals are all acceptable, it receives a substrate sensing signal (step 150) from the substrate sensing subsystem 20. As discussed above, this signal can include a variety of information resulting from interaction between the mark and the system, including information about substrate feed alignment, substrate type, size, and lot, as well as a sequence ID. This mark is evaluated for each of a series of conditions (step 152), and any uncorrectable failure detected (step 154) results in the issuance of a diagnostic message (step 148) and rejection of the substrate.

If no mark is detected (step 162), the system issues a diagnostic message (step 148), which preferably identifies the nature of the error, and ceases its current run. If errors are detected in the mark (step 164), the proof certification engine can attempt correction based on the error correcting code 68 (step 174). If the error cannot be corrected, the system issues a diagnostic message (step 148), which preferably identifies the nature of the proofing substrate error, and ceases its current run.

If there are no uncorrectable errors in the mark, the proof certification engine 26 tests the substrate sensing signal to detect misalignment of the substrate during feeding (step 166). If alignment errors are detected, the system issues a diagnostic message (step 148), which preferably identifies the nature of the alignment error, and ceases its current run. If there are no alignment errors, the sequence number is tested to determine whether the substrate is out of sequence (168). If the substrate is out of sequence, such as in the case of a re-feed of a substrate onto which some printing had already taken place, the system issues a diagnostic message (step 148), which preferably identifies the nature of the sequence error, and ceases its current run. If the substrate is in sequence, the substrate size is tested against the print data (step 170). If the substrate is too small for the print data, the system issues a diagnostic message (step 148), which preferably identifies the nature of the error, and ceases its current run. If the substrate is too large for the print data, the system may also issue a diagnostic message and cease its current run, but this is less important because the use of a substrate that is too large but otherwise usable will not result in the soiling of the proofing system.

The proof certification engine 26 then compares the substrate type with the data and ink to determine if they are compatible (step 178). If they are not, such is in the case where the inks can't reproduce colors in the print data on the substrate to within tolerance levels specified in the print certification standards, the system issues a diagnostic message, which preferably identifies the nature of the error, and ceases its current run.

If the substrate type, data, and ink are compatible, the substrate type is then used to adjust print parameters based on substrate lot and type (step 180). Adjustments of this type can include color table adjustments that enable the proofer to adjust the amounts of ink deposited in such a way as to achieve the closest color match. For example, substrates from a particular lot that are known to be somewhat more cyan than those from the usual lots might require the deposition of less cyan ink to match a particular reference printer.

Once all certification standards have been satisfied, the proof certification engine 26 provides a signal enabling the proofing engine to generate a proof of the data to be printed with the reference printer. It also provides certification notice data signals to the proofing engine, which are used to add a certification notice to the proof (step 156). The system can thus ensure that only certified proofs meeting the certification standards are generated, and that only such proofs are labeled with a certification notice. The certification notice also conveys to both the operator and customer that particular certification standards were adhered to in the preparation of the proof. And printing a certification notice on the proof may also reduce the possibility of mistaking an earlier draft run from another printer for a final sign-off proof.

The certified proofing system can store the parameters for its print runs in an area that is accessible to other systems. Other computers can then access this information using sequence numbers for individual sheets. This can allow proofs to be tracked after they are generated (step 158).

Referring again to FIG. 1, the certified proofing system 10 can use its network connection in a variety of ways 36 during the certification process. The proof certification standards and profiles can be downloaded from a central location, for example. The ink sensing subsystem 18 and substrate sensing subsystem 20 can also obtain lists of expired or recalled ink or substrate batches from ink, substrate, and/or proofer manufacturers, allowing defective batches of ink and print substrates to be recalled quickly and efficiently. And encryption keys and/or updated field definitions for the marks can be downloaded to the proofer or otherwise accessed through the network connection. It may further be possible to load optimizing patches to the certification system, such as by loading more stringent tests for newer types of errors discovered in the field or relaxed tests that prevent common types of false rejections.

Figure 16:
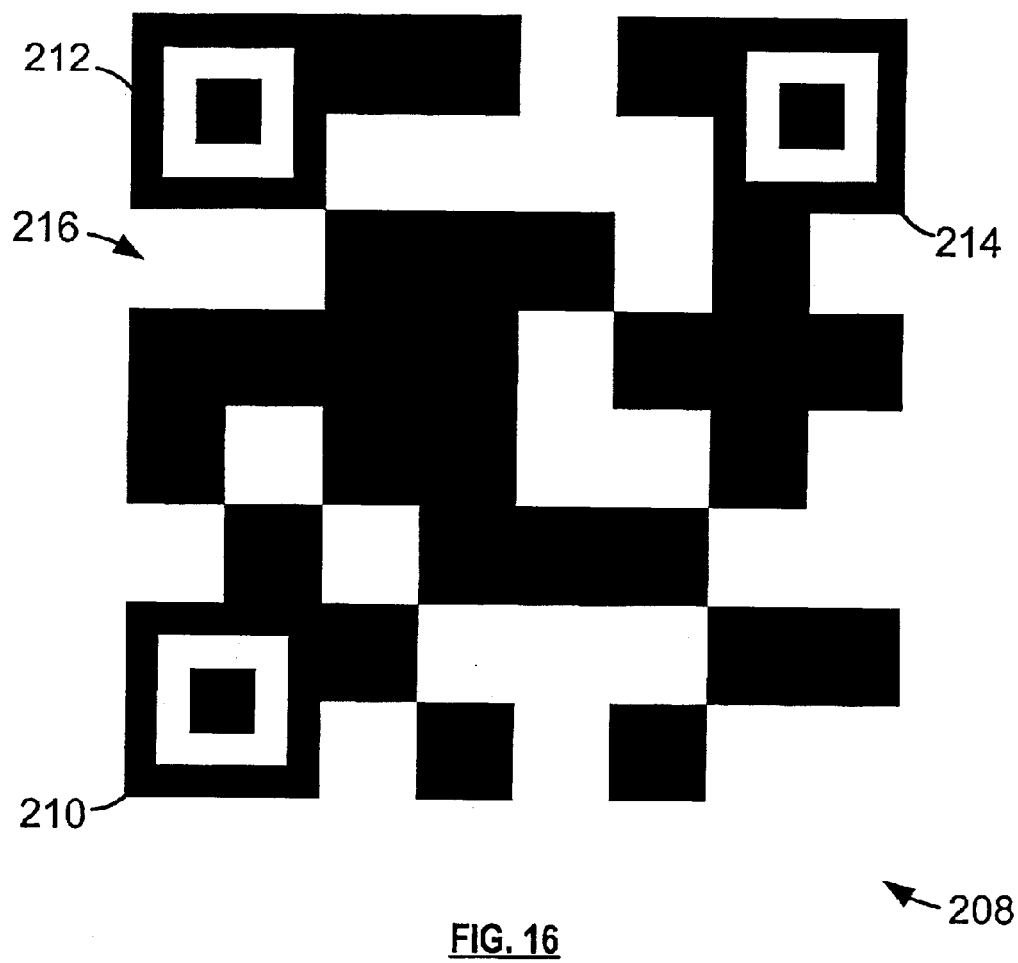
FIG. 16 is a diagram of a first type of mark for the substrate of FIG. 15.
Figure 17:
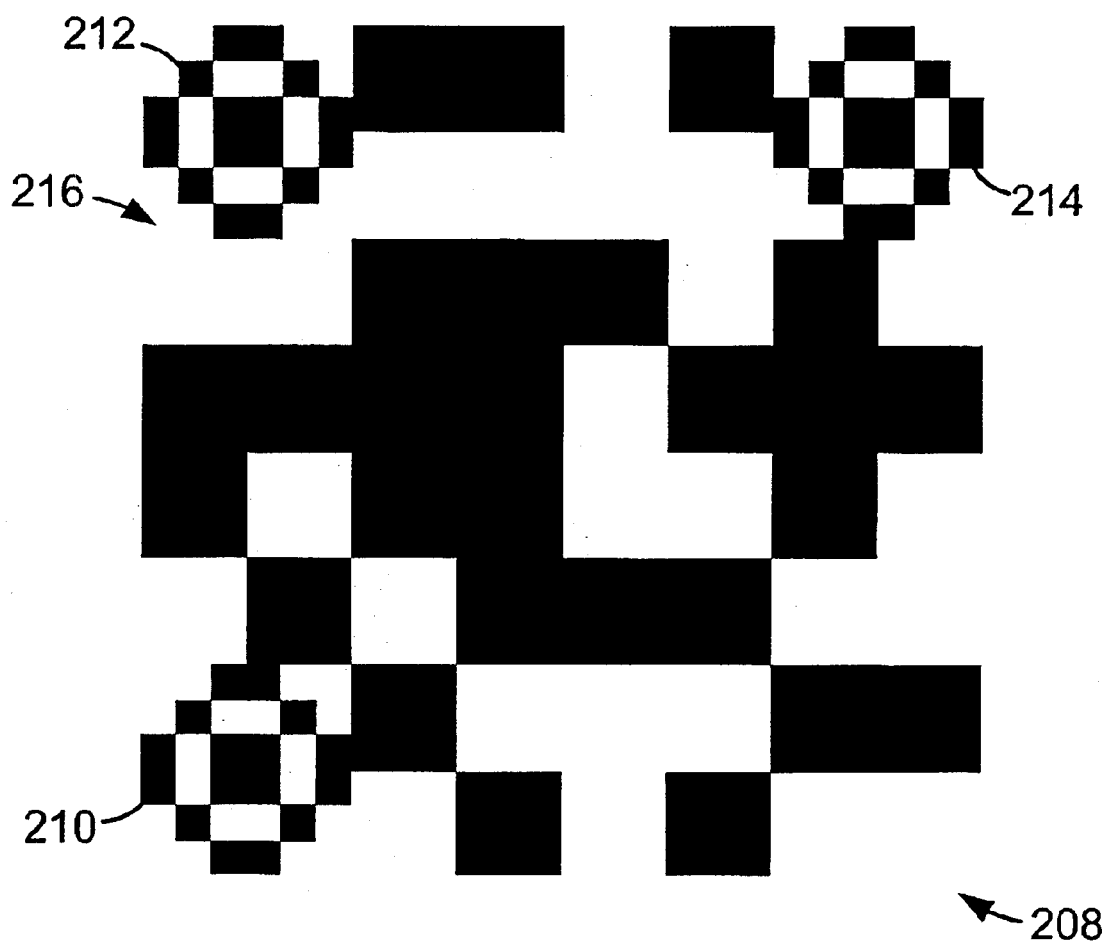
FIG. 17 is a diagram of a second type of mark for the substrate of FIG. 15.

Referring to FIGS. 2, 15–17 the certified proofing system 10 can employ a Charge-Coupled Device (CCD) array as the detector 40, and in this case does not require a slit 44. This type of detector can also allow the system to read numerous types of marks, such as two-dimensional marks 202, 204, 206, 208 placed in the four corners of a printable sheet 200. Each of the marks includes three registration markings 210, 212, 214 and a data marking area 216. As shown in FIGS. 16 and 17, the registration marks can be one of two types of bull's eye-shaped markings on three corners of the periphery of the data area, and can be located using a straightforward correlative search technique. The data area can include a series of rectangular areas or data cells that can be left empty or filled with one or more colors of ink.

The makeup and positioning of the mark allow the system to detect a variety of error conditions in two dimensions, including local and overall misalignment, shrinkage, and/or stretching. The positioning of the marks allow the system's sensor to determine whether the page was fed properly (marks on leading and trailing edges positioned at same distance from edge of drum), whether it was a full page (no marks missing), and whether there was excessive shrinkage, excessive expansion, or tearing (spacing between marks is within predetermined tolerance range). The registration markings within the marks allow the system to accurately locate the marks and serve as the basis for the longer measurements between marks. They also allow for precise reading of the information represented in the data area.

The placement of the marks can provide information about the orientation of the print sheet. If the marks are only printed on one face of the sheet, the system can detect a sheet that has been fed upside-down. This type of detection can be important where the media is only coated for printing on one side. And if the marks encode different information, the system can detect sheets that are fed in the wrong direction. This type of detection can be important where the media is pre-printed or pre-punched. Even if the marks all encode the same information, they provide some redundancy in the reading process. This allows the system to scan two or more of the marks and derive information from the mark that has the lowest error correcting code score, for example. In some situations, the system may be configured to read only one or two of the marks.

In one embodiment, the array is a 24×24 pixel array having an effective resolution of 72 pixels per inch. The mark is an 8×8 array of 3×3 pixel data cells, with 2×2 registration markings in three of its corners, leaving 52 data cells. These can be divided by row as presented in table 3.

TABLE 3

| Field | Row | Length | Description |
| --- | --- | --- | --- |
| Substrate Type, Size, etc. | 1–2 | 8 | Specifies a type that has predetermined properties such as substrate type (e.g., paper, transparency) and coating type, as well as the dimensions of the substrate |
| Substrate Lot | 3–4 | 16 | Specifies which process run made the substrate (10 bits may be adequate) |
| Substrate Sequence ID | 5–6 | 16 | Each substrate in lot numbered consecutively. May cycle through codes or make all sheets unique (14 bits may be adequate) |
| Error Correcting Code | 7–8 | 12 | Code that permits detection and/or correction of errors in the reading of the mark, such as a parity code, cyclic redundancy code or, a Hamming code. In one embodiment, this is a Reed-Solomon code with four bits per word. |

Figure 18:
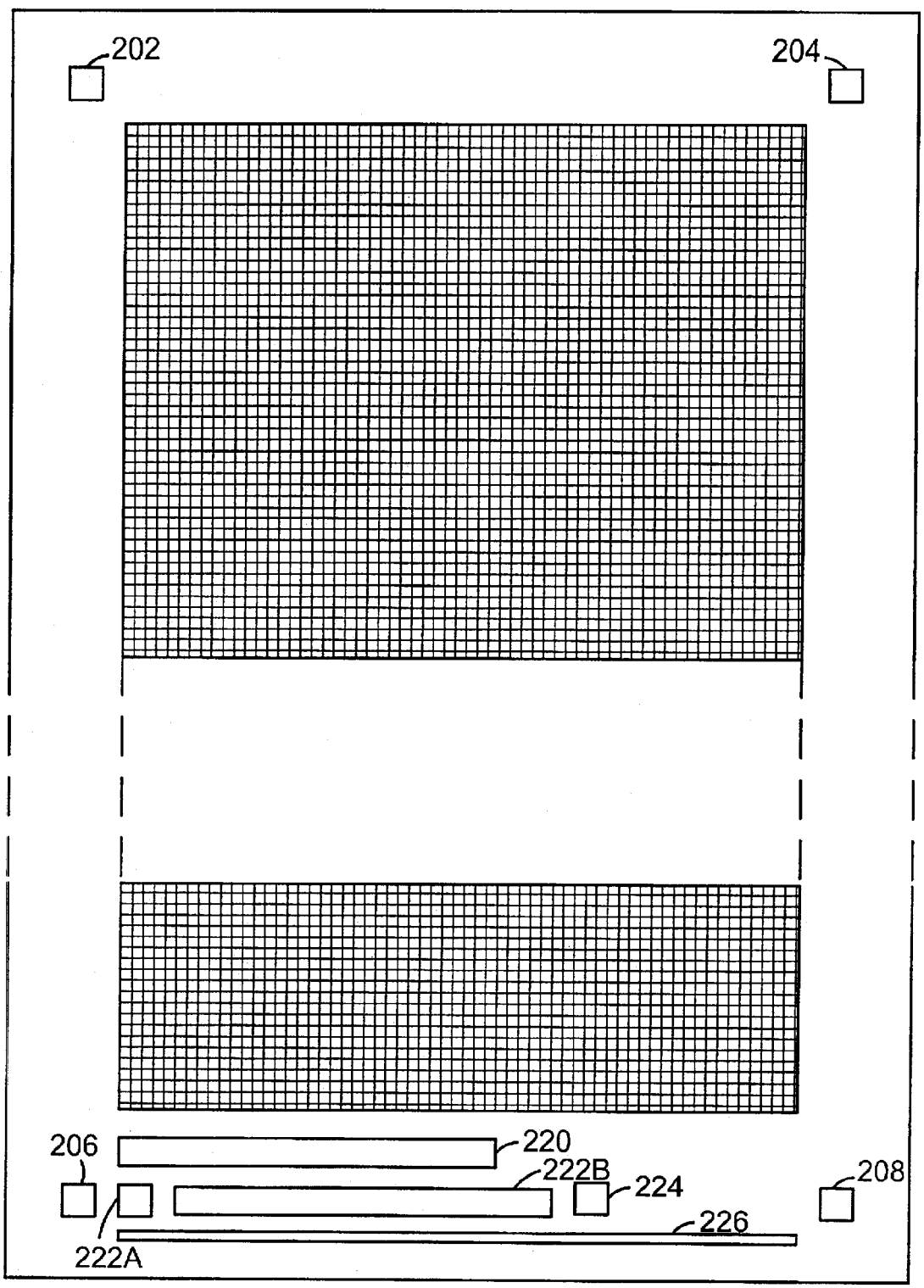
FIG. 18 is a diagram of a certified proof after proofing and showing a certification notice produced by the system of FIG. 1.

Referring to FIG. 18, the certification notice itself 220 can take the form of a logo identifying the entity certifying the proof. The mark can also include or be printed in connection with one or more calibration test strips 222A, 222B, a resolution indicator 224, and/or a status line 226. The status line can include information such as the date and time at which the print was made, the type of printer and mode used, an identification number for the printer, and/or calibration type, time, and date. This approach provides an area that conveniently groups together a variety of useful information for evaluation of the proof.

Figure 19:
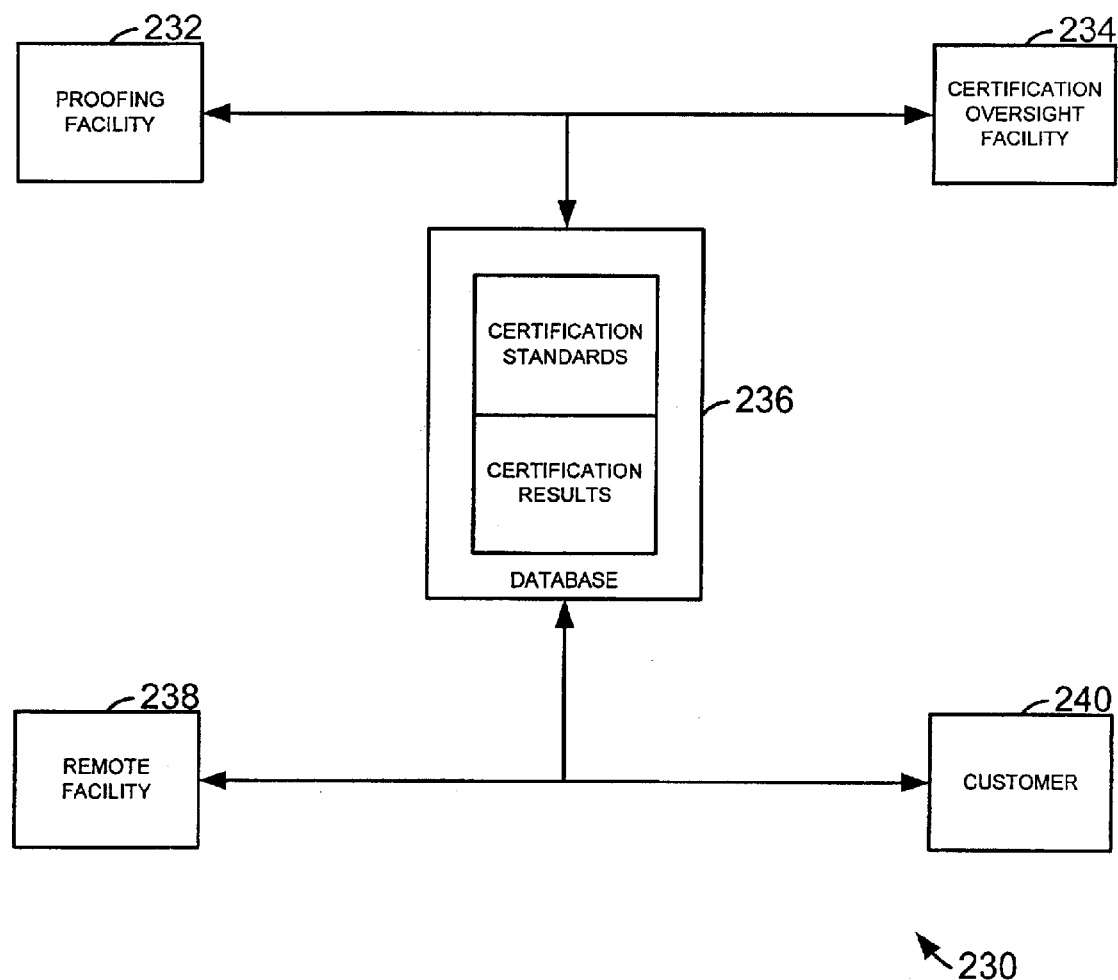
FIG. 19 is a diagram of a networked proof management for use with the system of FIG. 1.

Referring to FIG. 19, the certified proofing system 10 can also be monitored and/or updated remotely, such as via the Internet. These operations can take the form of isolated interactions between two individual computers, or they can take place as part of a networked proof management system 230. This system can include a central database 236 that can store certification standards, certification results, and/or information about other aspects of the printing process. The database can be accessed from one or more printer proofing facilities 232, where proofs are generated. It can also be accessed from one or more other remote facilities 238 maintained by the same organization. And one or more certification oversight facilities 234, which may be provided by the manufacturer of the proofing system 10, may also be able to access the database. Where the proofs are produced commercially for customers 240 these customers may have access to the database as well. The information shown as stored in the database can be stored centrally or in a distributed fashion in one or more of the facilities in the proof management system and accessed from there by some or all of the facilities.

Providing remote access to proofing data can allow a third party organization, such as the printer's manufacturer, to assist in ensuring that standards for contract proofs are adhered to, possibly even according to evolving standards on a sheet-by-sheet basis. In such systems, the third party organization can be responsible for defining the proof certification standards and monitoring the system for proper operation. The third party can also provide updates, such as substrate lot values and cartridge ID values, and even enforce recalls of defective ink and substrate lots.

Storing certification results in a central database can also allow for efficient tracking of proofing. In an organization where proofing is performed centrally for a number of satellite offices, for example, the satellite office personnel can access information about a particular proof by using its sequence number, which can be machine-read from the marks on the substrate, to access its record in the database. It may also be desirable in some instances to store a certification result in addition to or even instead of the certification notice printed on the proofs.

Of course, the nature of the commitment made by a third party in providing oversight or certification of a remote process will depend on the technical capabilities of the certification features available, and the needs of the parties involved. And while the names of parts and technical concepts and the nature of operation of the system might at first blush appear to imply some level of legal responsibility between the parties, no such relationship should be inferred from this document. Legal responsibilities should instead be explicitly spelled out in appropriate communications between the parties.

The above example has presented a particular embodiment that follows a particular sequence. As discussed earlier, however, one of ordinary skill in the art would understand that the functions and structures presented above could be distributed differently and the objectives accomplished differently. The sequence followed by the embodiment is also one of many possible sequences that could be developed to accomplish the ends of the invention. The particular steps presented could be performed in a different order or by different elements, and some of the steps might not be required at all in particular implementations. Some of the steps could also be combined or even performed in parallel. Internal signal formats may also vary. In some instances, only simple binary values or even analog values can be provided between functional entities, while in other instances a multi-bit words with a series of fields having predetermined meanings could be used.

Many features of the fluid management systems according to the invention are also suitable for use in other types of printing systems. These can include other types of printing systems, such as drop-on-demand inkjet printers, thermal transfer printers, or even laser printers. They can also include other types of printing systems, such as direct-to-plate systems, which can dispense a plate-writing fluid. These fluids include direct plate-writing fluids, which by themselves change properties of plates to allow them to be used in printing presses, and indirect plate-writing fluids, which require further process steps.

The present invention has now been described in connection with a number of specific embodiments thereof. However, numerous modifications which are contemplated as falling within the scope of the present invention should now be apparent to those skilled in the art. For example, while the drawings show the certified substrate in the form of flat sheets, the principles of the invention are equally applicable to other types of substrates that are evaluated in small proof runs before mass reproduction. Such applications may include decorative screening of metals, textiles, and product packaging, as well as the manufacture of electronic circuits. Other mark detection methods could also be used, such as the detection of magnetic ink, and other proofer systems could be certified, such as the pens that deliver and deflect the ink. It is therefore intended that the scope of the present invention be limited only by the scope of the claims appended hereto. In addition, the order of presentation of the claims should not be construed to limit the scope of any particular term in the claims.

What is claimed is:

1. A set of ink-jet printable proofing sheets, comprising: a plurality of at least five sheets, each comprising:
   a first printable face having a periphery including first, second, third, and fourth edges, wherein the first and third edges are disposed opposite each other on the first printable face, wherein the second and fourth edges are disposed opposite each other on the first printable face, and wherein the first face has properties resulting from a deposited ink drop print-enhancing treatment,
   a second face sharing the periphery and the first, second, third, and fourth edges of the first printable face, and
   a first machine-readable mark located on one of the first and second faces and including a plurality of data areas of different densities, wherein the combination of densities in the data areas are unique to each sheet in the plurality of sheets.

2. The set of claim 1 wherein the first printable face includes an added deposited ink drop print-enhancing composition.

3. The set of claim 1 wherein the first mark on each sheet includes a plurality of fields and wherein the marks are encrypted using a public-key encryption sheet.

4. The set of claim 1 wherein the combination of at least some of the density differences in the marks on each of the sheets uniquely identify a type for the sheet on which they are located.

5. The set of claim 1 wherein the combination of at least some of the density differences in the marks on each of the sheets uniquely identify a size for the sheet on which they are located.

6. The set of claim 1 wherein the combination of at least some of the density differences in the marks on each of the sheets uniquely identify a lot for the sheet on which they are located.

7. The set of claim 1 wherein the combination of at least some of the density differences in the marks on each of the sheets define an error-correcting code for the sheet on which they are located.

8. The set of claim 1 wherein the first mark on each sheet includes at least one registration marking in addition to the data areas.

9. The set of claim 8 wherein the first mark on each sheet includes at least three registration markings in addition to the data areas.

10. The set of claim 8 wherein the first mark on each sheet includes a plurality of triangular data markings.

11. The set of claim 1 wherein the first mark is printed in cyan ink.

12. The set of claim 1 wherein the first mark is printed with an invisible ink.

13. The apparatus of claim 1 wherein the first machine-readable mark has a chroma of at least about 20 in L'a'b' space.

14. The set of claim 1 wherein each sheet further includes a second machine-readable mark located on a same one of the first and second faces and including a plurality of data areas of different densities, wherein the combination of densities in the data areas are unique to each sheet in the plurality of sheets.

15. The set of claim 14 wherein the first and second marks on each sheet include at least one registration marking in addition to the data areas.

16. The set of claim 14 wherein the first and second marks on each sheet include at least three registration markings in addition to the data areas.

17. The set of claim 1 wherein the plurality of sheets includes at least 25 sheets.

18. The set of claim 1 wherein the plurality of sheets are at least about 70% blank.

19. The set of claim 1 wherein the plurality of sheets is packaged in a wrapper.

20. The set of claim 1 wherein a plurality of subsets of the plurality of sheets are each packaged in a wrapper.

21. The set of claim 1 further including a rigid packaging element for providing support to the first and second faces, wherein the rigid packaging element is more rigid than the plurality of sheets.

22. The set of claim 21 wherein the plurality of sheets and the rigid packaging element are packaged in a wrapper.

23. The set of claim 22 wherein the rigid packaging element forms part of a wrapper that packages the sheets.

24. The set of claim 1 wherein the data areas of different densities employ an encoding method capable of uniquely identifying at least about 10,000,000 sheets.

25. The set of claim 1 wherein the data areas of different densities employ an encoding method capable of uniquely identifying at least about $2^{40}$ sheets.

26. The set of claim 1 wherein the first and second faces are a least 11 inches by 18 inches.

27. The set of claim 1 wherein the first and second faces are a least 20 inches by 28 inches.

28. The set of claim 1 wherein the machine readable mark is located in a margin area proximate one of the edges of one of the first and second faces.

29. The set of claim 1 further including a second machine-readable mark on each sheet, wherein the first and second machine-readable marks are aligned in a direction parallel to the first edge.

30. The set of claim 29 wherein the first machine readable mark is located in a margin area proximate a corner between the first and second edges and wherein the second machine readable mark is located in a margin area proximate a corner between the second and third edges of one of the first and second faces.

31. The set of claim 30 wherein the first and second marks include the same combination of densities in the data areas.

32. The set of claim 1 wherein each sheet further includes a second machine-readable mark, a third machine-readable mark, and a fourth machine-readable mark, wherein the first and second machine-readable marks are aligned in a direction parallel to the first edges of each sheet, and wherein the third and fourth machine-readable marks are also aligned in a direction parallel to the first edges of each sheet.

33. The set of claim 32 wherein the first machine readable marks are located in a margin area proximate a corner between the first and second edges of each sheet, wherein the second machine readable marks are located in a margin area proximate a corner between the second and third edges of one of the first and second faces or each sheet, wherein the third machine readable marks are located in a margin area proximate a corner between the third and fourth edges of each sheet, and wherein the fourth machine readable marks are located in a margin area proximate a corner between the first and fourth edges of one of the first and second faces of each sheet.

34. The set of claim 33 wherein the first, second, third, and fourth marks include the same combination of densities in the data areas.

35. The set of claim 34 wherein the sheets are at least about 4.5 thousandths of an inch thick.

36. The set of claim 35 wherein the sheets are at least about 7 thousandths of an inch thick.

37. The method of claim 1 wherein the step of marking employs a machine-readable marking code having a capability of producing at least about 10,000 marks.

38. The method of claim 1 wherein the step of marking employs a machine-readable marking code having a checksum capability.

39. The method of claim 38 further including the step of stacking the assembled sheets.

40. The method of claim 38 further including the step of packaging the assembled sheets.

41. The method of claim 38 further including the step of packaging the assembled sheets, and further including repeating the steps of providing, cutting, marking, assembling, and packaging to create a plurality of sets of packaged sheets.

42. The method of claim 41 further including the step of distributing the sets of packaged sheets to different locations.

43. A set of ink-jet printable proofing sheets, comprising:
   a plurality of at least five sheets, each comprising:
      a first printable face having a periphery including first, second, third, and fourth edges, wherein the first and third edges are disposed opposite each other on the first printable face, wherein the second and fourth edges are disposed opposite each other on the first printable face, and wherein the first face has properties resulting from a deposited ink drop print-enhancing treatment,
      a second face sharing the periphery and the first, second, third, and fourth edges of the first printable face,
      a first machine-readable mark located on one of the first and second faces and including plurality of data areas of different densities, and
      a second machine-readable mark, wherein the first and second machine-readable marks are aligned in a direction parallel to the first edge.

44. The set of claim 43 wherein the first machine readable mark is located in a margin area proximate a corner between the first and second edges and wherein the second machine readable mark is located in a margin area proximate a corner between the second and third edges of one of the first and second faces.

45. The set of claim 44 wherein the first and second marks include the same combination of densities in the data areas.

46. The set of claim 43 wherein each sheet further includes a second machine-readable mark, a third machine-readable mark, and a fourth machine-readable mark, wherein the first and second machine-readable marks are aligned in a direction parallel to the first edges of each sheet, and wherein the third and fourth machine-readable marks are also aligned in a direction parallel to the first edges of each sheet.

47. The set of claim 46 wherein the first machine readable marks are located in a margin area proximate a corner between the first and second edges of each sheet, wherein the second machine readable marks are located in a margin area proximate a corner between the second and third edges of one of the first and second faces or each sheet, wherein the third machine readable marks are located in a margin area proximate a corner between the third and fourth edges of each sheet, and wherein the fourth machine readable marks are located in a margin area proximate a corner between the first and fourth edges of one of the first and second faces of each sheet.

48. The set of claim 47 wherein the first, second, third, and fourth marks include the same combination of densities in the data areas.

* * * * *